(12) United States Patent
Smithyman et al.

(10) Patent No.: US 11,462,720 B2
(45) Date of Patent: Oct. 4, 2022

(54) ELECTRONIC CIRCUITS WITH DIRECTLY INTEGRATED ELECTROCHEMICAL CELLS

(71) Applicant: Imprint Energy, Inc., Alameda, CA (US)

(72) Inventors: Jesse Smithyman, Oakland, CA (US); Konstantin Tikhonov, Pleasanton, CA (US); Christine Ho, Fremont, CA (US); Alexander Gurr, Berkeley, CA (US)

(73) Assignee: Imprint Energy, Inc., Alameda, CA (US)

( * ) Notice: Subject to any disclaimer, the term of this patent is extended or adjusted under 35 U.S.C. 154(b) by 82 days.

(21) Appl. No.: 16/875,435

(22) Filed: May 15, 2020

(65) Prior Publication Data

US 2020/0365871 A1 Nov. 19, 2020

Related U.S. Application Data

(60) Provisional application No. 62/849,257, filed on May 17, 2019.

(51) Int. Cl.
*H01M 4/04* (2006.01)
*H01M 10/04* (2006.01)
*H01M 10/42* (2006.01)

(52) U.S. Cl.
CPC ......... *H01M 4/0402* (2013.01); *H01M 10/04* (2013.01); *H01M 10/425* (2013.01)

(58) Field of Classification Search
CPC ... H01M 4/0402; H01M 10/04; H01M 10/425
See application file for complete search history.

(56) References Cited

U.S. PATENT DOCUMENTS

| | | | |
|---|---|---|---|
| 9,076,589 B2 | 7/2015 | Wright et al. | |
| 9,276,292 B1 | 3/2016 | MacKenzie | |
| 10,530,011 B1 | 1/2020 | MacKenzie et al. | |
| 10,593,961 B2 | 3/2020 | MacKenzie et al. | |
| 2006/0216586 A1* | 9/2006 | Tucholski | H01M 6/40 429/162 |

(Continued)

FOREIGN PATENT DOCUMENTS

EP 2584642 A1 * 4/2013 ............ H01M 10/42

*Primary Examiner* — Jimmy Vo
(74) *Attorney, Agent, or Firm* — Polygon IP, LLP

(57) ABSTRACT

Provided are electronic circuits, comprising electrochemical cells directly integrated with other devices of the circuits, and methods of manufacturing these circuits. The direct integration occurs during cell manufacturing, which allows sharing components, reducing operation steps and failure points, and reducing cost and size of the circuits. For example, a portion of a cell enclosure may be formed by a circuit board, providing direct mechanical integration. More specifically, the cell is fabricated right on the circuit board. In the same or other examples, one or both cell current collectors extend outside of the cell boundary and used by other devices, providing direct electrical integration without a need for intermediate connections and eliminating additional failure points. Furthermore, printing one or more components of electrochemical cells, such as electrolytes and current collectors, allows achieving higher levels of mechanical and electrical integration that are generally not available in conventional cells.

20 Claims, 14 Drawing Sheets

(56) References Cited

U.S. PATENT DOCUMENTS

| | | | |
|---|---|---|---|
| 2006/0227523 A1* | 10/2006 | Pennaz | H01M 6/40 361/783 |
| 2008/0180061 A1* | 7/2008 | Koski | H01M 10/441 320/136 |
| 2012/0276431 A1* | 11/2012 | Groshert | H01M 50/502 174/126.1 |
| 2017/0062880 A1* | 3/2017 | Riemer | H01M 10/48 |
| 2017/0288280 A1 | 10/2017 | Shi et al. | |
| 2018/0294454 A1 | 10/2018 | MacKenzie et al. | |

* cited by examiner

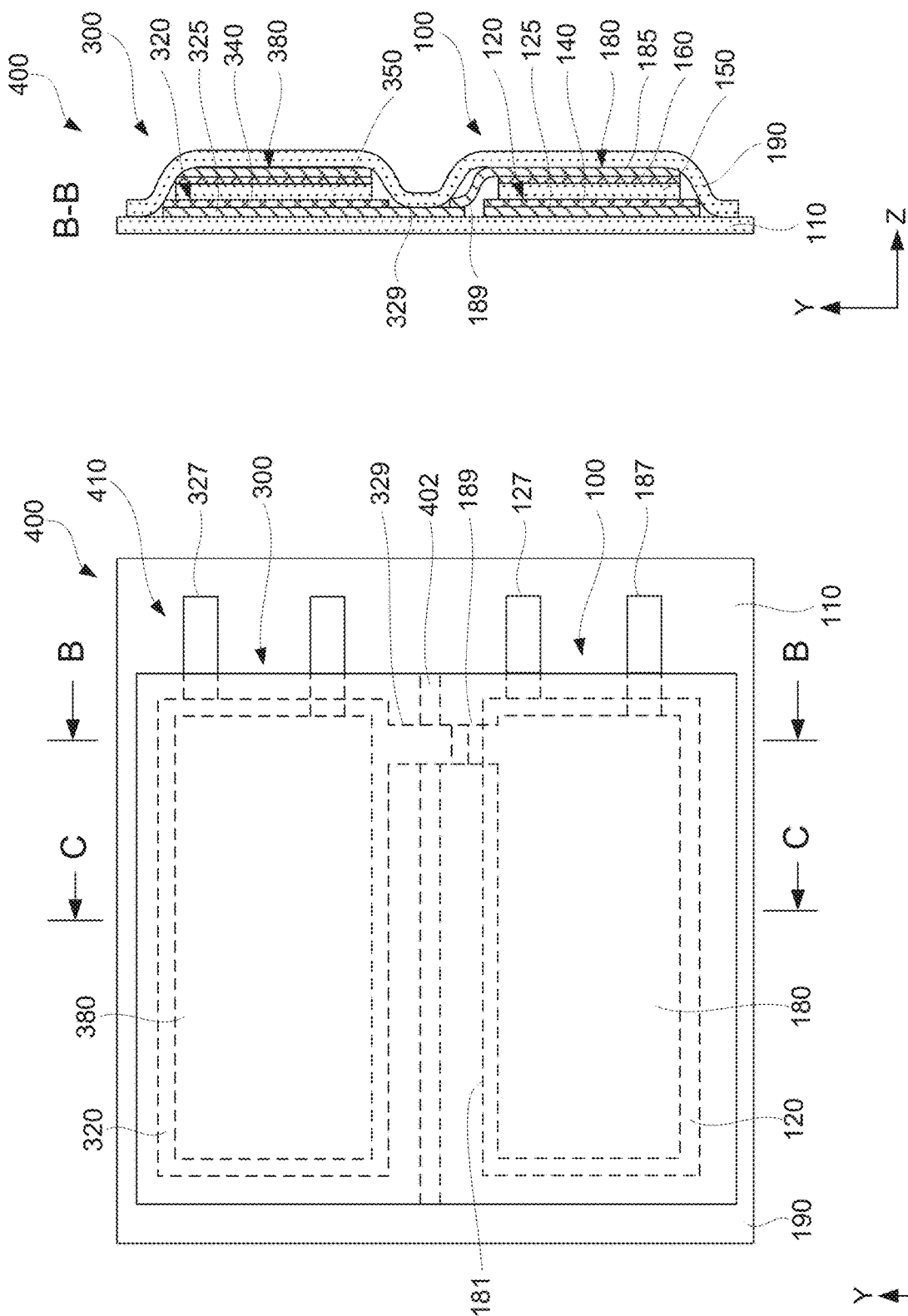

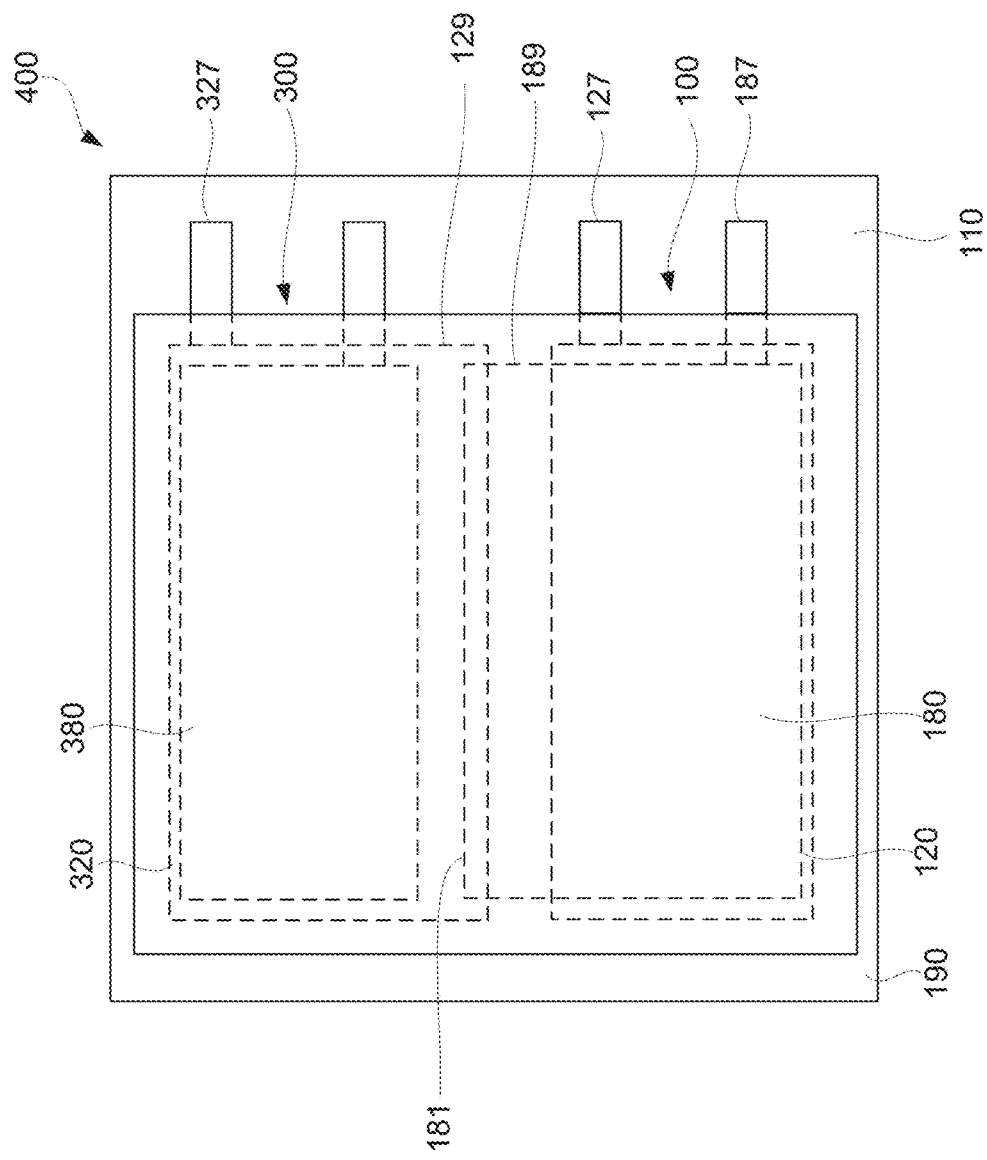
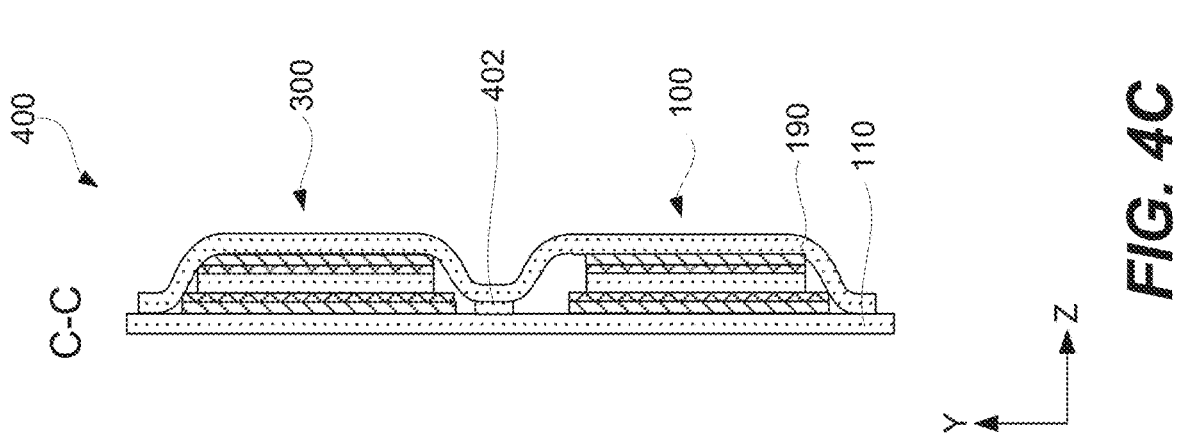

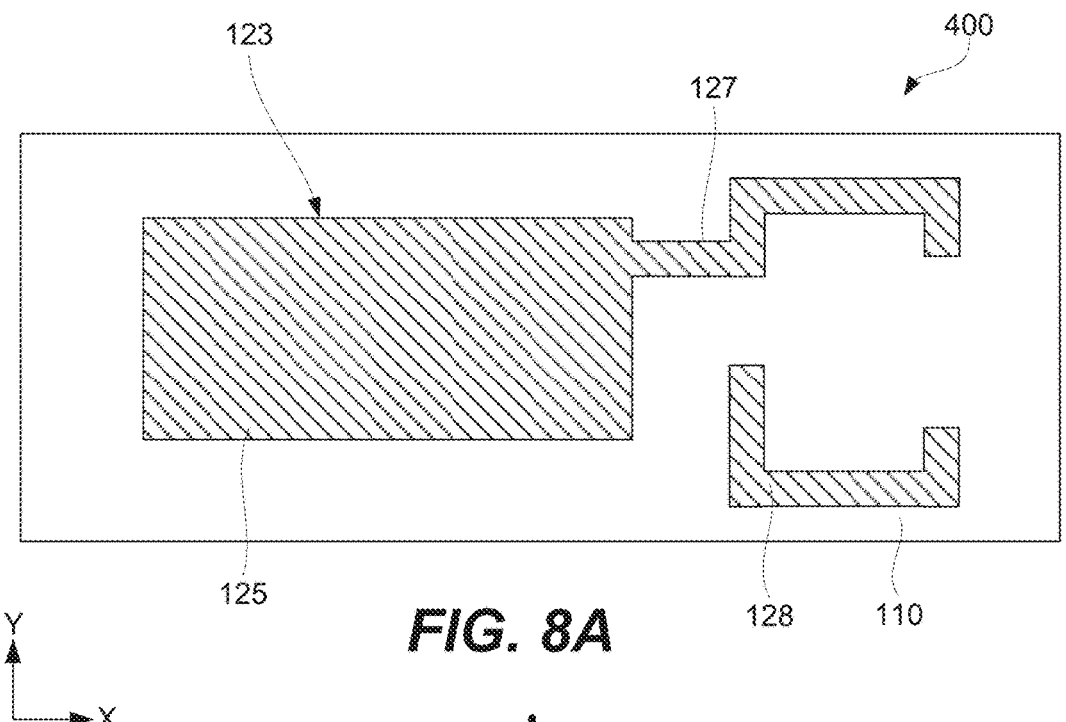
FIG. 8A
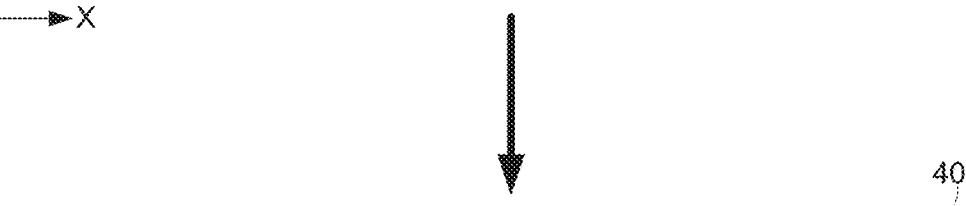
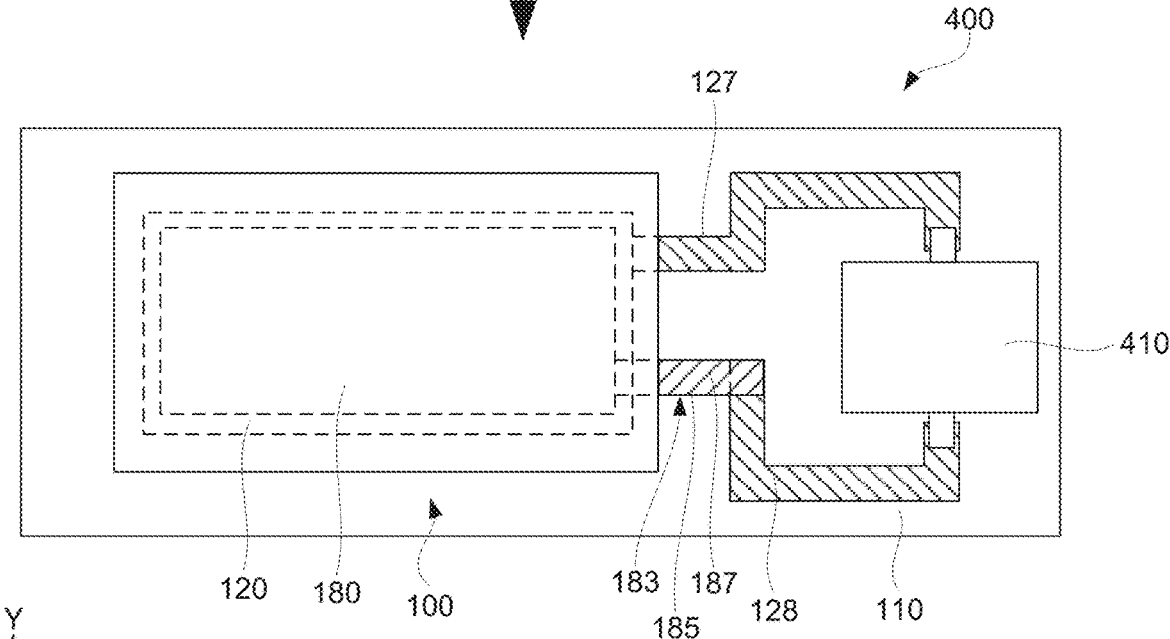
FIG. 8B

ELECTRONIC CIRCUITS WITH DIRECTLY INTEGRATED ELECTROCHEMICAL CELLS

CROSS-REFERENCE TO RELATED APPLICATIONS

This application claims the benefit under 35 U.S.C. § 119(e) of U.S. Provisional Patent Application 62/849,257, entitled: "ELECTRONIC CIRCUITS WITH DIRECTLY INTEGRATED ELECTROCHEMICAL CELLS", filed on 2019 May 17, which is incorporated herein by reference in its entirety for all purposes.

BACKGROUND

Various design aspects and techniques used for manufacturing of conventional electrochemical cells typically preclude direct integration of these electrochemical cells into circuits, powered by these electrochemical cells, as well as other components. Instead, this integration occurs in a separate process, i.e., after the electrochemical cells are fully manufactured. This conventional integration, which may also be referred to as a multi-stage integration, requires additional operations, components, and costs in comparison to the direct integration. For purposes of this disclosure, the direct integration is defined as a process of integrating an electrochemical cell with a circuit device or other electrochemical cells during manufacturing of the electrochemical cell and/or the circuit device. In other words, during the direct integration, the electrochemical cell and the circuit device are co-manufactured and may share at least one component, processing step, and the like.

The overall integration of electrochemical cells into circuits may be conceptually divided into mechanical integration and electrical integration. The mechanical integration involves mechanically attaching an electrochemical cell (e.g., the enclosure of the electrochemical cell) to various structural circuit components of the circuit (e.g., a board). The electrical integration involves forming electrical connections between the electrical terminals of the electrochemical cell and the corresponding terminals of the circuit. Electrical terminals are also referred to as tabs. Conventional methods typically involve the fabrication of standalone electrochemical cells, followed by separate integration. Overall, conventional batteries are viewed as standalone devices that are later mechanically and electrically integrated into circuits. These independent manufacturing processes and post-manufacturing mechanical and electrical integrations are costly and time consuming, requiring additional operations and components, which are often redundant (serve the same function) yet create additional failure points.

What is needed are electronic circuits with directly integrated electrochemical cells and methods of manufacturing these electronic circuits.

SUMMARY

Provided are electronic circuits, comprising electrochemical cells directly integrated with other devices of the circuits, and methods of manufacturing these circuits. The direct integration occurs during cell manufacturing, which allows sharing components, reducing operation steps and failure points, and reducing cost and size of the circuits. For example, a portion of a cell enclosure may be formed by a circuit board, providing direct mechanical integration. More specifically, the cell is fabricated right on the circuit board. In the same or other examples, one or both cell current collectors extend outside of the cell boundary and used by other devices, providing direct electrical integration without a need for intermediate connections and eliminating additional failure points. Furthermore, printing one or more components of electrochemical cells, such as electrolytes and current collectors, allows achieving higher levels of mechanical and electrical integration that are generally not available in conventional cells.

In some examples, a directly integrated electronic circuit comprises a first packaging layer and an electrochemical cell, manufactured on and directly integrated to the first packaging layer and further comprising a positive electrode, a negative electrode, an electrolyte layer, disposed and providing ionic communication between the positive electrode and the negative electrode, and a second packaging layer. This electrochemical cell may be referred to as a first electrochemical cell to differentiate from one or more other electrochemical cells, referenced below. The first packaging layer and the second packaging layer are sealed to each other and isolate the electrolyte layer, at least a portion of the positive electrode, and at least a portion of the negative electrode from an environment. The directly integrated electronic circuit further comprises a device, directly integrated to the first packaging layer and electrically connected to at least one of the positive electrode or the negative electrode over the first packaging layer. The electrochemical cell and the device are directly integrated by the first packaging layer during manufacturing of at least one of the electrochemical cell and the device.

In some examples, the device is a second electrochemical cell, comprising a second positive electrode, a second negative electrode, a second electrolyte layer disposed and providing ionic communication between the second positive electrode and the second negative electrode. The negative electrode of the first electrochemical cell is directly connected with the second positive electrode of the second electrochemical cell.

In some examples, the positive electrode comprises a positive current collector and a positive active material layer, supported by the positive current collector. The negative electrode comprises a negative current collector and a negative active material layer, supported by the negative current collector. The device is directly connected and interfaces at least one of the positive current collector or negative current collector. In some examples, a portion of the at least one of the positive current collector or negative current collector, connected to the device, is laminated to the first packaging layer.

In some examples, the device is electrically connected to the at least one of the positive electrode or the negative electrode using a mechanical crimp. In more specific examples, the mechanical crimp protrudes through the first packaging layer.

In some examples, portion of the device is stacked with a portion of the at least one of the positive electrode or the negative electrode. In more specific examples, the directly integrated electronic circuit further comprises a connector seal, positioned over the portion of the device stacked with the portion of the at least one of the positive electrode or the negative electrode.

In some examples, the first packaging layer comprises an opening at the location where the device is electrically connected to the at least one of the positive electrode or the negative electrode. In more specific examples, the at least one of the positive electrode or the negative electrode comprises an opening, coinciding with the opening in the first packaging layer.

In some examples, the first packaging layer is a flexible printed circuit board. In the same or other examples, each of a positive active material layer of the positive electrode interfacing the electrolyte layer, a negative active material layer of the negative electrode interfacing the electrolyte layer, and the electrolyte layer are printed. For example, the negative active material layer comprises zinc. In some examples, at least one of the positive electrode, the electrolyte layer, or the negative electrode comprises an ionic liquid. More specifically, each of the positive electrode, the electrolyte layer, and the negative electrode comprises an ionic liquid. In some examples, the electrochemical cell is substantially free from organic solvents.

Also provided is a method of manufacturing a directly integrated electronic circuit. In some examples, the method comprises providing a first packaging layer, wherein the first packaging layer supports and directly integrated with a first patterned conductive layer, comprising a positive current collector, a positive tab, and a connecting tab, the positive current collector is monolithic with the positive tab. The method also comprises forming an electrochemical stack over the positive current collector. The electrochemical stack comprises a positive active material layer, an electrolyte layer, and a negative active material layer. At least one of the positive active material layer, the electrolyte layer, and the negative active material layer is printed. The method also comprises forming a second patterned conductive layer, comprising a negative current collector disposed over the electrochemical stack and in electronic communication with the negative active material layer. The first packaging layer further supports and is directly integrated with a device, electrically connected to at least one of the positive current collector or the negative current collector over the first packaging layer.

In some examples, forming the second patterned conductive layer comprises printing the second patterned conductive layer over the electrochemical stack and over at least a portion of the device, thereby forming a direct electrical connection between the negative active material layer and the device by the second patterned conductive layer.

In some examples, forming the second patterned conductive layer comprises printing the second patterned conductive layer over the electrochemical stack and over at least a portion of the connecting tab, thereby forming a direct electrical connection between the negative active material layer and the connecting tab by the second patterned conductive layer.

In some examples, at least one of the connecting tab or the positive tab is electrically connected to the device.

BRIEF DESCRIPTION OF THE DRAWINGS

FIG. 4A is a top view of an electronic circuit, comprising two interconnected electrochemical cells, in accordance with some examples.

FIG. 4B is a cross-sectional view of the directly integrated electronic circuit of FIG. 4A, showing interconnecting tabs of the two electrochemical cells overlapping in the space between the cells, in accordance with some examples.

FIG. 4C is a cross-sectional view of the directly integrated electronic circuit of FIG. 4A, showing an electrolyte seal extending in the space between the cells, in accordance with some examples.

FIG. 4D is a schematic top view of a directly integrated electronic circuit comprising two interconnected electrochemical cells, showing a different type of connection between the cells.

FIGS. 8A and 8B are schematic top views of a directly integrated electronic circuit during various manufacturing stages.

DETAILED DESCRIPTION

Figure 1:
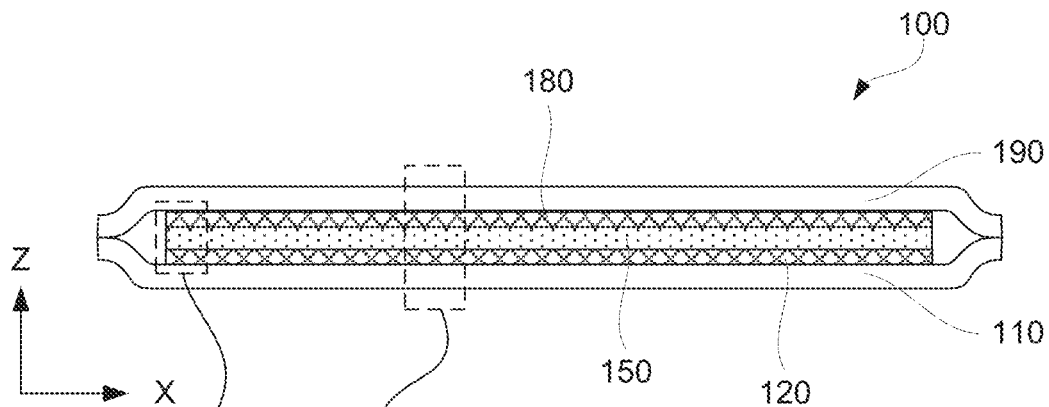
FIG. 1 is a schematic cross-sectional view of an electrochemical cell, illustrating major components of the cell, in accordance with some examples.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting. On the contrary, it is intended to cover alternatives, modifications, and equivalents as may be included within the spirit and scope of the present disclosure as defined by the appended claims.

Various examples are described herein in the context of printable electrochemical cells, such as cells comprising multi-valent metal ions (e.g., $Zn^{2+}$) for carrying the charge between the positive and negative electrodes. "Multivalent" is defined, for purposes of this disclosure, as an atomic or molecular species carrying more than one full electron-charge. However, one having ordinary skill in the art will appreciate that various features described herein are applicable to other types of electrochemical cells and/or other methods of manufacturing electrochemical cells. For example, electrochemical cells with monovalent metal ions carrying the charge may be similarly integrated into electronic circuits.

In this disclosure, the term "anode" refers to a negative electrode, which includes one or more negative active materials. The term "cathode" refers to a positive electrode, which includes one or more positive active materials. Various examples of negative active materials and positive active materials are described below.

"Ionic liquids" or, more specifically, "room temperature ionic liquids" are defined as a class of liquids, which are organic salts and which have low melting points (e.g., below 100° C.). Ionic liquids are characterized by high ionic conductivities and low vapor pressures, which make them well suitable for electrolyte applications. Furthermore, ionic liquids tend to be electrochemically and thermally stable. Combining ionic liquids with certain polymers may be used to form electrolytes, which, in some examples, have ion transport characteristics similar to conventional liquid electrolytes (e.g., solvent-based electrolytes). Furthermore, these ion transport characteristics are much better than that of conventional polymer electrolytes or solid-state electrolytes. Furthermore, in some examples, electrolytes formed using ionic liquids are structurally robust and able to maintain physical separation between positive and negative electrodes, similar to polymer and solid-state electrolytes. These physical separation characteristics are retained even under compression and bending conditions, thereby eliminating the need for porous separators. Finally, in a typical ambient environment and at a room temperature, electrolytes formed using ionic liquids do not dry out or "sweat" since the ionic liquids are negligibly volatile.

INTRODUCTION

Printing of various components of electrochemical cells provides various opportunities for direct integration (e.g., during manufacturing) of these electrochemical cells into electronic circuits. This integration involves mechanical integration, in which one or more components of a cell are attached to or shared by a device of the same electronic circuit or another cell. For example, the same packaging layer may be used for supporting and sealing internal components of a cell and also for supporting and/or electrical insulating a device, connected to and powered by this cell. This integration and component-sharing features reduce manufacturing costs and complexity as well as the size of the resulting electronic circuit. For example, instead of manufacturing a battery as a separate component and then mechanically coupling this battery to a device, the battery can be manufactured on the substrate and on the same production line as the device. In one example, a packaging layer of an electrochemical cell may be a device and various internal components of the cell may be printed directly on the device. In other examples, a packaging layer is positioned between a cell and a device and serves as a support and a barrier for both.

Integration features, associated with a battery design, in particular printed battery design, increase the reliability of individual components and the overall assembly by minimizing the number of parts, connections, and failure points. For examples, the packing density (e.g., the number of components per unit size of the circuit) can be increased through integration. Specifically, the footprint of an electrochemical cell may be rather significant in comparison to other components, such as microprocessors, antenna, etc. Integration allows positioning various smaller components around the electrochemical cell and/or on the top of the cell. Furthermore, printing components of an electrochemical cell allows forming a footprint (of the cell) that specifically fits around one or more devices thereby providing a greater utilization of the space.

Examples of Directly Integrated Electronic Circuits

Electronic circuits and their components, such as electrochemical cells, will now be described with reference to various figures. As noted above, a directly integrated electronic circuit comprises at least an electrochemical cell and a device, which may be another electrochemical cell, a sensor, an antenna, a microprocessor, an integrated circuit (IC), a display, a speaker, and the like. While the following description focuses on integrating two electrochemical cells, one having ordinary skill in the art would understand that these features are applicable to integration of other devices.

FIG. 1 is a schematic illustration of electrochemical cell 100, in accordance with some examples. Electrochemical cell 100 comprises positive electrode 120, negative electrode 180, and electrolyte layer 150, which may be collectively referred to as an internal component. Electrolyte layer 150 is disposed, and provides ionic communication between, positive electrode 120 and negative electrode 180. In some examples, electrochemical cell 100 multiple positive electrodes and/or multiple negative electrodes, e.g., forming a stack of alternating positive and negative electrodes. Additional features of positive electrode 120 and negative electrode 180 are described below with reference to FIG. 2.

Electrochemical cell 100 also comprises first packaging layer 110 and second packaging layer 190, which enclose and protect the internal component of electrochemical cell 100 from the environment. For example, first packaging layer 110 and second packaging layer 190 may be sealed around the perimeter. Various examples of packaging layers are described below. In some examples, one or both of first packaging layer 110 and second packaging layer 190 are other components of electronic circuit, which electrochemical cell 100 is also a part of. Specifically, in some examples, first packaging layer 110 and/or second packaging layer 190 are shared with other devices, such as another electrochemical cell, sensor, antenna, charging circuitry, and the like. When multiple electrochemical cells share the same substrate, these cells may be interconnected in series, parallel, or a combination of two methods. In some examples, multiple electrochemical cells may be stacked along the Z axis, such that second packaging layer 190 is shared by two electrochemical cells, as a top packaging layer in one cell and as a bottom packaging layer in another cell.

Figure 2A:
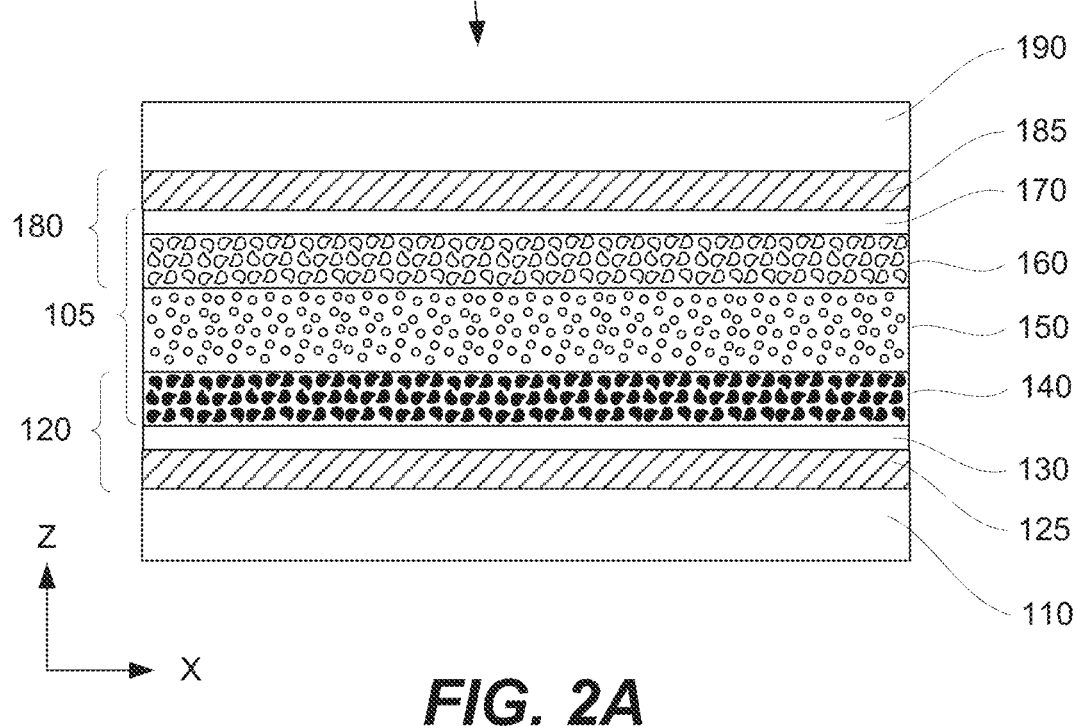
FIG. 2A is an expanded cross-sectional view of a portion of the electrochemical cell in FIG. 1, illustrating additional features of negative and positive electrodes the electrochemical cell, in accordance with some examples.
Figure 3A:
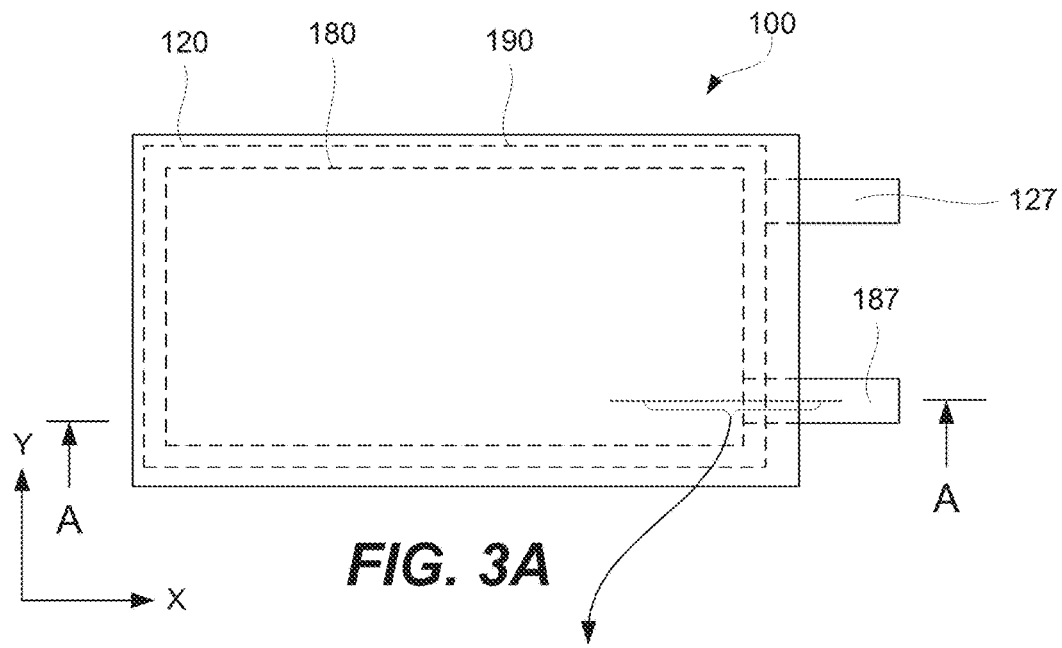
FIG. 3A is a schematic top view of the electrochemical cell referencing the position of a cross-section shown in FIG. 3B, in accordance with some examples.

Referring to FIG. 2A, positive electrode 120 comprises positive current collector 125 and positive active material layer 140, which may be printed over positive current collector 125 or laminated to positive current collector 125, e.g., using a conductive pressure sensitive adhesive layer. Positive current collector 125 provides electronic conductivity between positive active material layer 140 and positive tab 127, which is schematically shown in FIG. 3A. In some examples, a portion of positive current collector 125, which is free from positive active material layer 140 and which extends outside of the boundary of first packaging layer 110 and second packaging layer 190, is operable as positive tab 127. Furthermore, positive current collector 125 may be shared with other components of the same electronic circuit. For example, positive current collector 125 may be shared by two adjacent cells, e.g., interconnected in series.

In some examples, positive current collector 125 is a metal foil having a thickness of between 1 micrometer and 80 micrometers or, more specifically, between 5 micrometers and 30 micrometers. Other examples of positive current collector 125 include graphite foil, foil made from carbon nanotubes (with or without a binder), metal-plated fibers, metal foams (e.g., nickel foam or copper foam), screens and extended metal structures, grids, woven metal mesh, printed layer (e.g., comprising a polymer binder and a conductive additive), and the like. In the same or other examples, positive current collector 125 is formed from, or at least comprises, one or more of nickel, stainless steel, regular steel, titanium, and aluminum.

In some examples, positive current collector 125 is printable. A printable current collector allows placement, attachment or lamination of a metal current collector with complex geometries, e.g., around other components of the circuitry. Furthermore, a printable current collector may comprise a polymer and a conductive filler (e.g., carbon, graphite, graphene, carbon nanotubes, or metal particles such as nickel, steal, and silver).

Figure 2B:
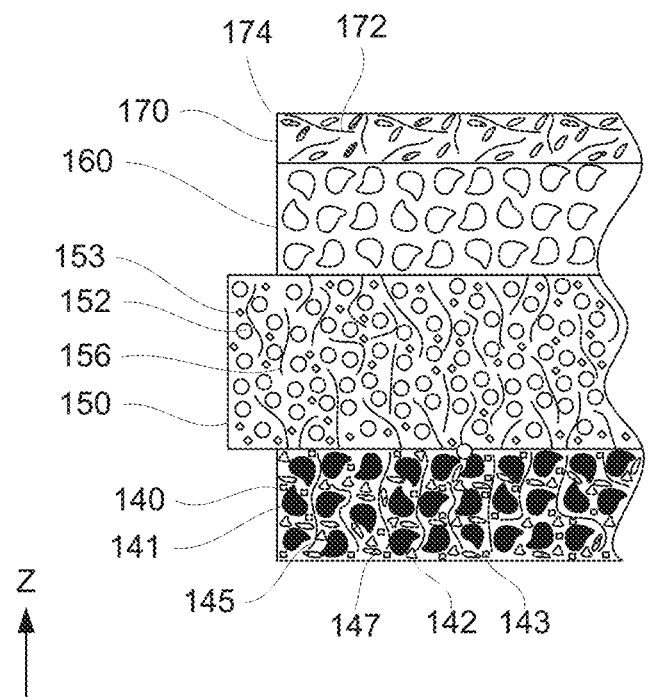
FIGS. 2B and 2C are expanded cross-sectional views of different examples of the internal component positions in the electrochemical cell in FIG. 1.

In some examples, positive active material layer 140 comprises positive active material 141 and positive layer binder 145 as schematically shown in FIG. 2B. In some examples, positive active material 141 comprises or consists essentially of a metal oxide or, more specifically, transition metal oxide (e.g., containing a metal from the 4th row of the Periodic Table of the Elements), such as manganese oxide ($MnO_2$), nickel oxide ($NiO_2$), vanadium oxide ($V_2O_5$), ferric phosphate ($FePO_4$), cobalt oxide ($CoO_2$), lead oxide (PbO), and chromium oxide ($Cr_2O_3$). In some examples, positive active material layer 140 further comprises conductive additive 147, such as conductive carbons (e.g., carbon black, graphite, carbon nanotubes, graphene), or conductive nanoparticles (e.g., metal nanoparticles). In some examples, positive active material layer 140 further comprises positive active layer ionic liquid 142, which may be the same as or different from electrolyte ionic liquid 152. Some examples of positive active layer ionic liquid 142 are 1-ethyl-3-methyl imidazolium bis(trifluoromethylsulfonyl) imide (EMIM TFSI), represented by the formula $C_8H_{11}F_6N_3O_4S_2$, and 1-ethyl-3-propyl pyrrolidinium bis(trifluoromethylsulfonyl) imide, imidazolium, pyrrolidinium, piperidinium, tetraalkyl ammonium ionic liquids with variety of anions: bis(trifluoromethane)sulfonimide (TFSO), trifluormethylsulfonyl (TFS), bis(fluorosulfonyl)imide (FSI), tetrafluoroborate ($BF_4$), bis(oxalato)borate (BOB), and the like. In some examples, positive active material layer 140 further comprises positive layer salt 143, such as zinc(II) bis (trifluoromethanesulfonyl)imide (Zn-TFSI), represented by the following formula $Zn(C_2F_6NO_4S_2)_2$, zinc chloride (ZnCl2), zinc fluoroborate ($Zn(BF_4)_2$), ammonium chloride ($NH_4Cl$), ammonium tetrafluoroborate ($NH_4BF_4$), potassium hydroxide (KOH), and the like. Also shown in FIG. 2A is positive interface layer 130, which is optional and when presented, operable as a primer or adhesion-promoter between the binder of positive active material layer 140 and positive current collector 125. Unlike positive active material layer 140, positive interface layer 130 comprises much higher amounts of polymer binders, such as at least about 5% by weight (e.g., between about 5% and 30%) or at least about 10% by weight or even at least about 20%. Positive interface layer 130 may be printed over positive current collector 125 using ink comprising, e.g., carbon black, poly(vinylidene fluoride) (PVDF), and n-methyl-2-pyrrolidone (NMP). The thickness of positive interface layer 130 may be between 0.5 micrometers and 5 micrometers or, more specifically, between 1 micrometer and 2 micrometers.

Referring to FIGS. 1 and 2A-2C, electrolyte layer 150 provides ionic communication between negative electrode 180 and positive electrode 120 or, more specifically, between negative active material layer 160 and positive active material layer 140. In some examples, electrolyte layer 150 comprises electrolyte binder 156, electrolyte ionic liquid 152, and electrolyte salt 153. Some examples of electrolyte binder 156 include, but are not limited to, polymers and copolymers of trifluoroethylene, tetrafluoroethylene, vinylidene chloride, vinylidene difluoride (difluoroethylene), hexafluoropropylene, styrene, butadiene, ethylene oxides, acrylate and/or methacrylate esters, variations and rubbers thereof, and so forth, as well as polyesters, polyanilines, polyethers, polyimides, copolymers and blends thereof, so forth. Electrolyte ionic liquid 152 enhances ionic conductivity of electrolyte layer 150. In some examples, the ionic conductivity of electrolyte layer 150 is between 2.3 mS/cm and 2.7 mS/cm. Electrolyte ionic liquid 152 comprises anions and cations, which, in some examples, are organic cations or inorganic cations. Some examples of these organic cations are imidazolium, pyrrolidinium, ammonium, pyridinium, piperidinium, phosphonium, sulfonium, and tetraalkyl ammonium. Some examples of inorganic cations include, but are not limited to, Li, Zn, Na, Al, Mn, Mg, and Y (yttrium) ions. Examples of anions include, but are not limited to, organosulfonate (e.g., methanesulfonate [mesylate], trifluoromethanesulfonate [triflate], toluenesulfonate [tosylate], so forth), organosulfimide (e.g., bis((methyl)sulfonyl)imide (MSI), bis(trifluoromethylsulfonyl)-imide (TFSI), sulfate, phosphate, organophosphate, organoborate (e.g., trialkyl borate, chelated organoborate, bis(oxalo)borate, so forth), tetrachloroborate, alurrinate, dicyanarride, carboxylate (e.g., formate, acetate), perchlorate, nitrate and halide (e.g., chloride, bromide, iodide). One specific example of electrolyte ionic liquid 152 is 1-butyl-3-methylimidazolium trifluoromethanesulfonate [$C_9H_{15}F_3N_2O_3S$]. Overall, ionic liquids, which are electrochemically stable in the operating voltage range of zinc and manganese dioxide electrodes may be used. Furthermore, ionic liquids that do not react with moisture and oxygen may be used allowing to perform deposition processes (e.g., printing) in the ambient environment.

In some examples, electrolyte salt 153 comprises multivalent metal ions, such as zinc, aluminum, magnesium, and/or yttrium ions. In some examples, the anion of electrolyte salt 153 is identical or chemically similar to the anion of electrolyte ionic liquid 152. Some example of such anions include, but are not limited to, chlorides, tetrafluoroborate ($BF_4^-$), trifluoroacetate ($CF_3CO_2^-$), trifluoromethansulfonate ($CF_3SO_3^-$), hexafluorophosphate ($PF_6$—), bis(trifluoromethylsulfonyl)amide ($NTf_2^-$), and bis(fluorosulfonyl)imide ($N(SO_2F)_2$). One specific example of a salt is zinc trifluoromethanesulfonate [$Zn(CF_3SO_3)_2$]. In some examples, an ionic liquid is partially or completely replaced with a low vapor pressure solvent.

In some examples, one or more ionic liquids completely replace organic solvents, conventionally used in electrolytes of electrochemical cells. As such, electrochemical cell 100 is substantially free from organic solvents, e.g., the amount of organic solvents in electrochemical cell 100 is less than 1% by weight or even less than 0.1% by weight.

Referring to FIG. 2A, negative electrode 180 comprises negative current collector 185, negative active material layer 160, and, in some examples, conductive pressure sensitive adhesive layer 170. Negative current collector 185 provides electronic conductivity between negative active material layer 160 and negative tab 187, shown in FIG. 3A. In some examples, a portion of negative current collector 185, free from negative active material layer 160 and extending outside of the boundary of first packaging layer 110 and second packaging layer 190 is operable as negative tab 187. Furthermore, similar to positive current collector 125, first packaging layer 110, and/or second packaging layer 190, negative current collector 185 may be shared by other components of the electronic circuit, outside of the electrochemical boundaries of electrochemical cell 100.

In some examples, negative current collector 185 is a metal foil or a metal screen having a thickness of between 1 micrometer and 80 micrometers or, more specifically, between 5 micrometers and 30 micrometers. Thinner structures provide more flexibility, but less structural integrity and electronic conductivity. In some examples, negative current collector 185 is formed from, or at least comprises, one or more of copper (e.g., copper alloy), brass, steel or stainless steel, copper, and zinc. In other examples, negative current collector 185 is a printed layer, comprising a polymer binder and a conductive additive. Some examples of the conductive additive used for a printed example of negative current collector 185 include, but are not limited to, silver, brass, indium, carbon, nickel, and copper. An example of negative current collector 185 may be formed using one or more of ink jet printing, screen printing, stencil printing, flexographic printing, and/or slot die coating.

In some examples, negative active material layer 160 is printed over electrolyte layer 150. Negative active material layer 160 may comprise or consist essentially (e.g., at least 95% by, weight or even at least 99% by weight) of an elemental metal. The elemental metal may be one providing monovalent ions (e.g., $Li^+$, $Na^+$, $Cu^+$) or polyvalent ions (e.g., $Zn^{2+}$, $Ni^{2+}$, $Al^{3+}$, $Ga^{3+}$, $Co^{3+}$, $Ca^{2+}$, $Mg^{2+}$, so forth). In some examples, negative active material layer 160 is operable to emit multivalent ions when undergoing an oxidation reaction. For example, zinc metal forms zinc ions of divalent charge ($Zn^{2+}$). In some examples, negative active material layer 160 comprises structures having multiple different morphological features (e.g., zinc flakes and spherical particles and nanoparticles) to increase electrode capacity and rate of discharge. Negative active material layer 160 may also comprise a polymer, and in some cases, a polymer and a conductive additive. The conductive additive may be a carbon material (e.g., carbon black, graphite, nanotubes, graphene) or a metal. For example, metals with low overvoltage of hydrogen evolution may be used to minimize side reactions. Some examples include indium, bismuth, brass, lead, and mercury.

Referring to FIG. 3, conductive pressure sensitive adhesive layer 170 provides an electro-mechanical connection between negative current collector 185 and negative active material layer 160. In some examples, conductive pressure sensitive adhesive layer 170 comprises polymer base 172 and conductive filler 174. Some examples of polymer base 172 include, but are not limited to, an acrylic polymer, isobutylene (e.g., polyisobutylene (PIB)) and other hydrocarbons, or silicones. Some examples of conductive filler 174 include, but are not limited to, metal particles, carbon-based particles, and the like. Some examples of metal particles include, but are not limited to, nickel particles, copper particles, indium particles, bismuth, brass, and silver particles. The particle size of conductive filler 174 of conductive pressure sensitive adhesive layer 170 may be between 1 micrometers and 100 micrometers or, more specifically, between 1 micrometer and 35 micrometers. The concentration of conductive filler 174 in conductive pressure sensitive adhesive layer 170 is less than about 60% by volume or, more specifically, less than about 30% by volume. At such low concentrations of conductive filler 174, the particles of conductive filler 174 are encapsulated by polymer base 172, further electrochemically isolating conductive filler 174 from the environment and, especially, from electrolyte layer 150.

First packaging layer 110 and second packaging layer 190 support internal components of electrochemical cell 100 and isolate these components from the environment. Furthermore, one or both of first packaging layer 110 and second packaging layer 190 may be used or provided by other components of the directly integrated electronic circuit as further described below. First packaging layer 110 and/or second packaging layer 190 may be flexible (e.g., able to bend) and conform to the stack formed by positive electrode 120, electrolyte layer 150, and negative electrode 180. First packaging layer 110 and/or second packaging layer 190 may be formed from paper (e.g. cardstock or different types/weaves/thicknesses of paper), polymeric or plastic materials (e.g., polyethylene tetrephthalate or polyester (PET), polyethylene, polypropylene, Kapton, polyimide, polyester ether ketone (PEEK), polyurethane, polydimethysiloxane or other silicone resins), fabric of various weaves and meshes (e.g. nylon, cotton, denim) silicon, printed circuit board (e.g. cured epoxy resin substrates, FR4, and flexible circuit boards), glass, metal foil, or combination thereof (e.g. fabric with plastic backing). In some examples, at least one of first packaging layer 110 or second packaging layer 190 is a microprocessor or a MEMS device. At least one of first packaging layer 110 or second packaging layer 190 may include an adhesive backing for attaching to other components.

In some examples, a packaging layer is a printable layer. A printable packaging layer allows lamination, placement, or attachment of this layer in limited spaces, e.g., due to other components of the circuitry.

Bridge Layer Examples

Figure 3B:
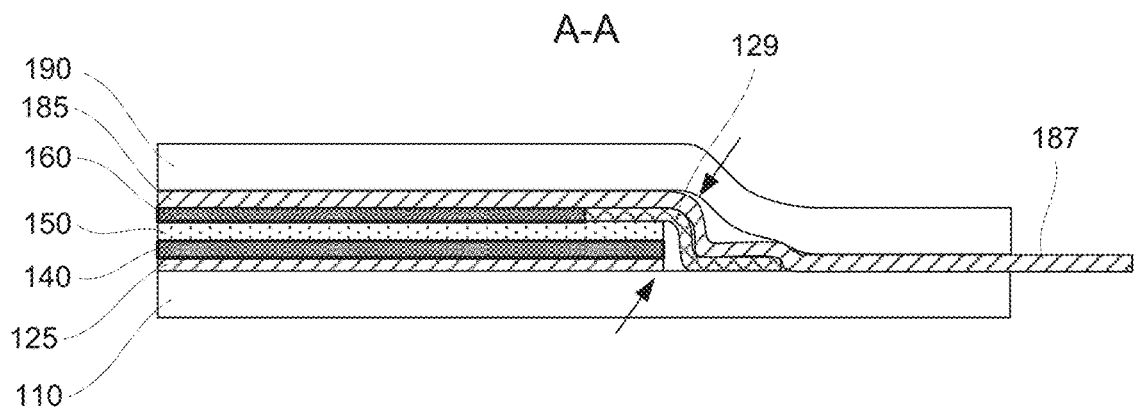
FIG. 3B is a schematic cross-sectional view of a portion of the electrochemical cell, showing the position of a bridge layer relative to other components of the electrochemical cell, in accordance with some examples.

Referring to FIGS. 3A and 3B, in some examples, electrochemical cell 100 comprises bridge layer 129. Bridge layer 129 covers an edge of electrolyte layer 150 and allows extending negative current collector 185 outside the stack formed by the electrodes and electrolyte layer 150 without causing electrical shorts inside electrochemical cell 100. Specifically, bridge layer 129 electrically isolates negative current collector 185 from positive active material layer 140 and from positive current collector 125. Furthermore, electrolyte layer 150 provides additional electronic insulation between the electrodes and, in some examples, extends past the edge of positive active material layer 140 and positive current collector 125. In some examples, bridge layer 129 is printed. For example, bridge layer 129 may be printed over electrolyte layer 150 and before or after printing negative active material layer 160.

In some examples, bridge layer 129 comprises a polymer binder and one or more fillers. Some examples of polymer binders suitable for bridge layer 129 include, but are not limited to, poly(vinylidene fluoride) (PVDF), poly(vinylidene fluoride-hexaflouropropylene) (PVDF-HFP), polyvinyl alcohol (PVA), poly(ethylene oxide) (PEO), poly (acrylo-nitrile) (PAN), and poly(methyl methacrylate) (PMMA), epoxy derivatives, and silicone derivatives. The polymer binder of bridge layer 129 is used to support the fillers, which may be in the form of particles, and to bind bridge layer 129 to other components of electrochemical cell 100, such as electrolyte layer 150. The filler provides mechanical stability to bridge layer 129 and electrical insulation characteristics. Various insulating materials may be used as the filler. One example of bridge layer 129 is a combination of PVDF (used as a binder) and silicon dioxide (SiO$_2$) particles used as the filler. In general, any materials compatible with the electrochemical system may be used.

In some examples, the function of bridge layer 129 is purely mechanical and electrically insulating. In other words, bridge layer 129 is disposed between negative current collector 185 and a sub-stack of electrolyte layer 150 and positive electrode 120, preventing any direct mechanical contact and electrical shorts between these components. Furthermore, bridge layer 129 may be used as a moisture getter and/or as a hydrogen gas (H$_2$) getter, e.g., by selecting specific materials for bridge layer 129. Other functions of bridge layer 129 are also within the scope. When operable as a moisture getter, bridge layer 129 is able to absorb the excess of moisture in electrochemical cell 129 as the moisture content increases and then release the absorbed moisture as the moisture content decreases.

In some examples, the thickness of bridge layer 129 is between 10 micrometers and 100 micrometers or, more specifically, between 25 micrometers and 50 micrometers. The thickness of bridge layer 129 may be within 50% of the thickness of negative active material layer 160 to ensure even surface for laminating negative current collector 185.

Examples of Electrical and Mechanical Cell Connections

Referring to FIGS. 4A, 7A, 7B, and 8B, in some examples, device 410 is electrically connected to at least one of positive electrode 120 or negative electrode 180 of electrochemical cell 100, thereby providing electrical aspects of the integration. The examples described below focus on connecting to negative electrode 180 of electrochemical cell 100. One having ordinary skill in the art will understand that various described features are also applicable for connecting to positive electrode 120.

Referring to FIGS. 4A, 7A, 7B, and 8B, device 410 is attached to and supported by first packaging layer 110 of electrochemical cell 100, thereby providing mechanical aspects of the integration. In specific examples, e.g., shown in FIG. 7A, device 410 is operable as first packaging layer 110 of electrochemical cell 100.

Referring to FIGS. 4A-4C, in some examples, device 410 is second electrochemical cell 300. Similar to electrochemical cell 100 described above, second electrochemical cell 300 comprises second positive electrode 320, second negative electrode 380, and second electrolyte layer 350. Second electrolyte layer 350 is disposed and provides ionic communication between second positive electrode 320 and second negative electrode 380.

In the example shown in FIGS. 4A and 4B, negative electrode 180 is directly connected with second positive electrode 320 (e.g., via a direct contact, welding, conductive tape, and the like). More specifically, negative electrode 180 comprises negative current collector 185 and negative active materials layer 160, supported by a portion of negative current collector 185. Another portion of negative current collector 185, which extends toward second electrochemical cell 300 outside of the boundary of negative active materials layer 160, is referred to as interconnecting negative tab 189. Similar, second positive electrode 320 comprises second positive current collector 325 and second positive active materials layer 340, supported by a portion of second positive current collector 325. Another portion of second positive current collector 325, which extends toward electrochemical cell 300 outside of the boundary of second positive active materials layer 340, is referred to as interconnecting positive tab 329. Interconnecting negative tab 189 and interconnecting positive tab 329 overlap and directly contact each other between stacks of electrochemical cell 100 and second electrochemical cell 300, formed by other components. In some examples, interconnecting negative tab 189 and interconnecting positive tab 329 are welded, soldered, crimped, or otherwise attached to each other to preserve the electrical connection.

In the example shown in FIGS. 4A and 4B, electrochemical cell 100 and second electrochemical cell 300 share first packaging layer 110 and second packaging layer 190. As described above, first packaging layer 110 and second packaging layer 190 isolate electrolyte layer 150, at least a portion of positive electrode 120, and at least a portion of negative electrode 180 from the environment. In these shared packaging layer examples, first packaging layer 110 and second packaging layer 190 further isolate second electrolyte layer 350, at least a portion of second positive electrode 320, and at least a portion of second negative electrode 380, and the second electrolyte layer 350 from the environment. Furthermore, in more specific examples, first packaging layer 110 and second packaging layer 190 further isolate interconnecting negative tab 189 of electrochemical cell 100 and interconnecting positive tab 329 of second electrochemical cell 300. In other words, the connection between interconnecting negative tab 189 and interconnecting positive tab 329 is protected from the environment and may be referred to as "an internal interconnection." First packaging layer 110 and second packaging layer 190 also provide support to interconnecting negative tab 189 and interconnecting positive tab 329.

Electrolyte Seal Examples

Referring to FIGS. 4A and 4B, in some examples, directly integrated electronic circuit 400 further comprises electrolyte seal 402 disposed and protruding between first packaging layer 110 and second packaging layer 190 in one direction (along the Z-axis). Electrolyte seal 402 is also disposed between electrolyte layer 150 and second electrolyte layer 350 in another direction (along the Y-axis). Electrolyte seal 402 prevents migration of materials from electrolyte layer 150 and second electrolyte layer 350 and ionically isolates electrochemical cell 100 from second electrochemical cell 300.

When directly integrated electronic circuit 400 comprises both electrolyte seal 402 and internal interconnection, interconnecting tabs may overlap electrolyte seal 402 as, for example, shown in FIG. 4A. The thickness of electrolyte seal 402 (along the Z-axis) in this overlap area may be smaller than in other parts of electrolyte seal 402. This thickness variation ensures that the gap between first packaging layer 110 and second packaging layer 190 is constant where electrolyte seal 402 interfaces first packaging layer 110 and second packaging layer 190.

Referring to FIGS. 4A and 4B, in some examples, interconnecting negative tab 189 extends. From edge 181 of negative electrode 180 such that interconnecting negative tab 189 has a width (along the X-axis) smaller than that of edge 181. Interconnecting negative tab 189 being narrow enhances flexibility of directly integrated electronic circuit 400 between electrochemical cell 100 from second electrochemical cell 300.

Referring to FIG. 4D, in some examples, interconnecting negative tab 189 forms an entire length of edge 181 of negative electrode 180. In these example, the overlap between interconnecting negative tab 189 and interconnecting positive tab 329 may be also used for blocking electrolyte migration between electrochemical cell 100 and second electrochemical cell 300. In other words, the electrolyte seal described above, may not be needed in these examples of complete overlap.

External Tab Examples

Figure 5A:
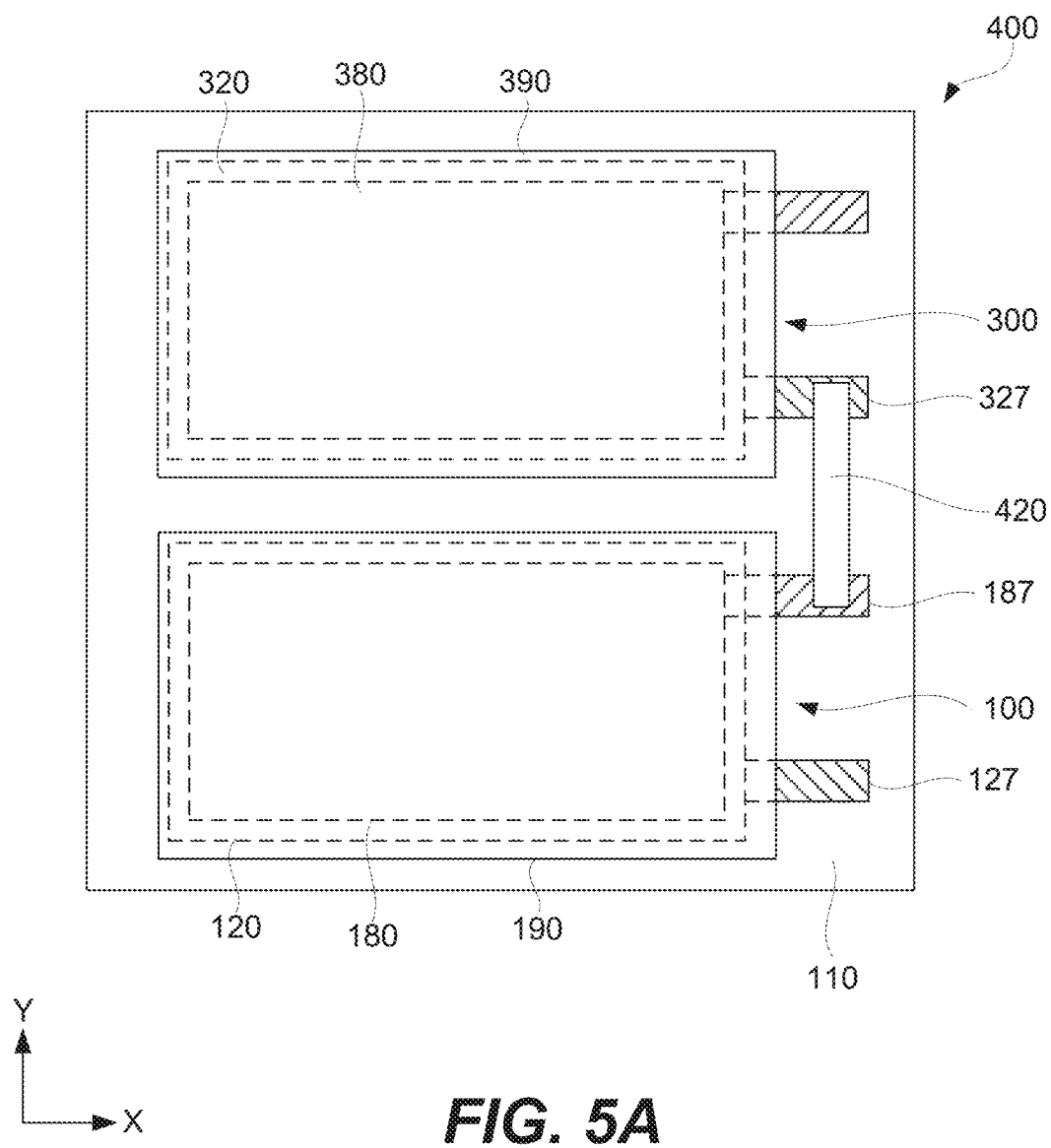
FIGS. 5A and 5B are top views of electronic circuits showing different types of connections between electrochemical cells.

External connections to electrochemical cells (e.g., to other cells and/or electronic circuitry) are conventionally formed by welding (e.g., ultrasonic welding, resistance welding, laser welding) or soldering. However, these conventional connection methods are not always applicable to thin flexible electrochemical cells, which utilize plastic substrates and/or plastic packaging components. For example, metal substrates are often positioned proximate or even adhered to a plastic substrate. Not only does the plastic substrate tend to interfere with the connection methods, but these plastic substrates are also not capable of withstanding high temperatures needed for conventional methods of connections. Furthermore, plastic substrates tend to limit the amount of force that can be applied to external tabs while forming these connections. For example, FIG. 5A illustrates negative tab 187, mechanically supported by first packaging layer 110 and connected to interconnecting element 420. Forming this connection (between negative tab 187 and interconnecting element 420) is challenging, if possible at all, using conventional techniques because of first packaging layer 110 overlapping with the connection area. For example, if an ultrasonic welding is used, the energy produced by the welder will dissipate through first packaging layer 110. Resistance welding is also challenging since first packaging layer 110 is non-conductive and, at the same time, blocks access to the side of negative tab 187 facing away from interconnecting element 420, e.g., when resistance welding electrodes are collinear and approach a stack of components (being welded) from opposite sides. It should be noted that some materials (e.g., steel and nickel) allow for resistance welding electrodes to approach the stack from the same side, e.g., opposite of first packaging layer 110. However, this approach is very limited and not available for many other materials, such as aluminum, copper, carbon coated metals, or metals with protective coatings. Likewise, laser welding is limited to particular materials, thicknesses and configurations and generally not applicable to parts with any coatings. Laser welding is also prone to generating a lot of heat, which can damage surrounding parts or a substrate.

Soldering (e.g., using a hot bar) is typically performed at about 180° C.-220° C. and takes between 5 seconds and 30 seconds. In some cases, the whole assembly may have to go through a reflow oven and be subjected to the above-referenced temperatures for several minutes. Exposure to such high temperatures is damaging to electrochemical cells, such as battery packaging, active materials, electrolyte, and the like. For example, one or both packaging layers may comprise a plastic film, such as PET, PE, or PP. The thickness of this film is, in some examples, between 10 micrometers and 125 micrometers or, more specifically, between 10 micrometers and 25 micrometers, e.g., for improved conformity to the shape of the printed battery layers, current collectors, and tabs. These thin films can shrink and crease during heat exposure compromising the sealing of electrochemical cell. In some examples, the packaging layer also comprises an adhesive (e.g., a rubber adhesive, an acrylic pressure sensitive adhesive), which is susceptible to high temperature exposure.

Figure 5B:
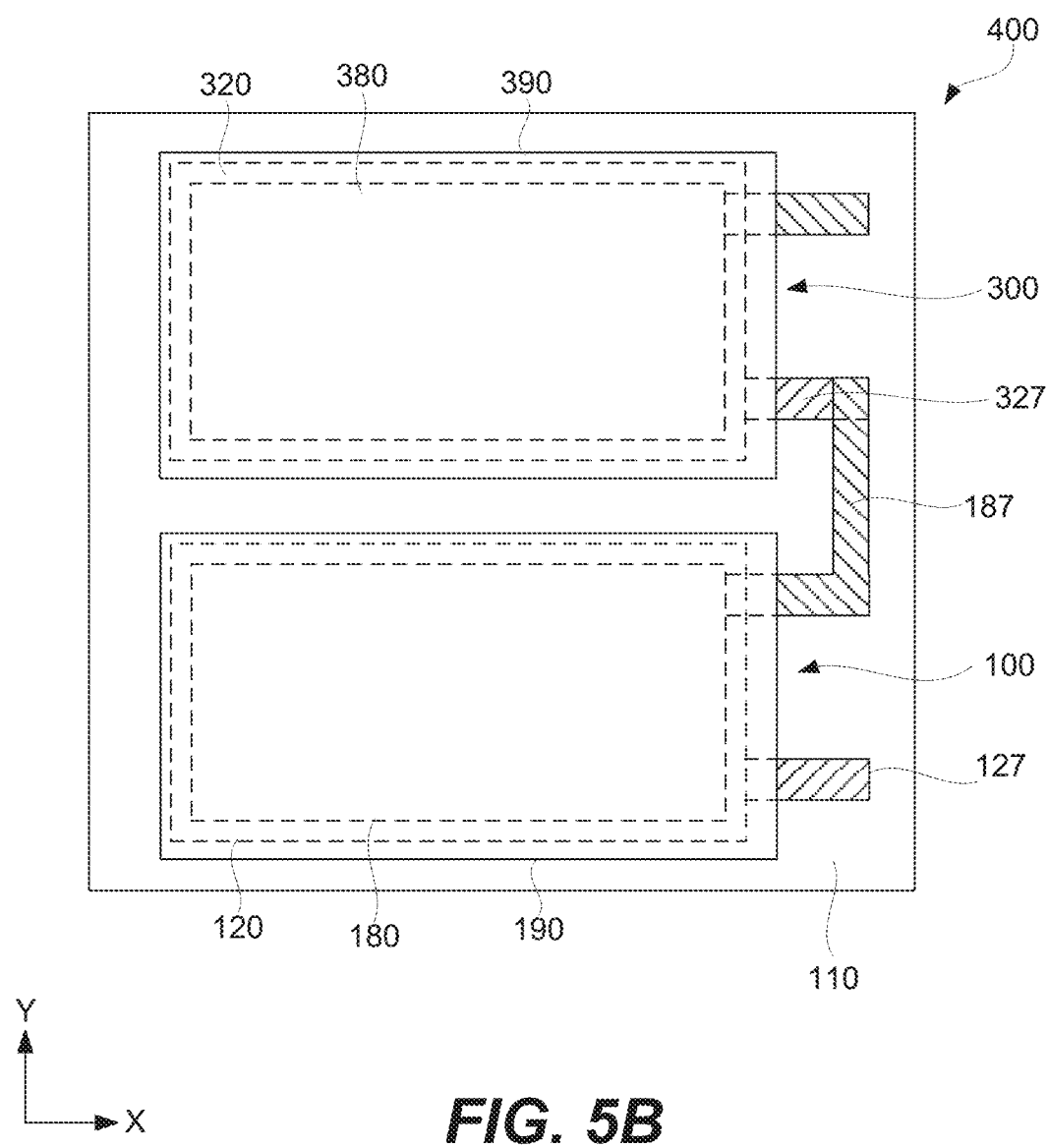

In some examples, connections shown in FIGS. 5A and 5B are formed using techniques without exposing any components of electrochemical cell 100 to a high temperature (e.g., temperature over 200° C.). For example, various types of mechanical and/or adhesive-based connections may be formed at room temperature or with minimal heating (e.g., to cure the adhesive). These low-temperature connection methods are especially useful for the integration of circuits, where conductive paths or battery terminals are comprised of materials such as aluminum, copper, carbon coated metals, or metals with protective coatings. It should be noted that any coating on metal surfaces (e.g., carbon) tends to interfere with conventional connection methods.

As noted above and seen in FIGS. 5A and 5B, one challenge of forming electrical connections to cell terminals is proximity (e.g., direct interface) of these cell terminals to packaging layers, which are electrical insulators with limited heat stability. In some examples, one or multiple terminals (e.g., forming a stack or offset within the same plane from each other) are laminated to one or two packaging layers, e.g., terminals being positioned between two packaging layers.

Referring to FIG. 5A, in some examples, negative electrode 180 comprises negative tab 187, extending outside of the boundary of second packaging layer 190. As such, negative tab 187 is not isolated from the environment by second packaging layer 190. Negative tab 187 is mechanically supported by first packaging layer 110. For example, negative tab 187 is laminated to first packaging layer 110.

Further referring to the example presented in FIG. 5A, second positive electrode 320 comprises second positive tab 327, electrically interconnected to negative tab 187 and also mechanically supported by first packaging layer 110. In this example, connection is formed by interconnecting element 420, which may be adhered to and supported by first packaging layer 110 and overlapping with each of second positive tab 327 and negative tab 187. However, other types of connections are also within the scope. Some of these connections are further described below with reference to FIGS. 6A-6J. Referring to FIG. 5B, in some examples, second positive tab 327 overlaps with negative tab 187 without a need for an intermediate structure.

Various examples of connections between second positive tab 327 and negative tab 187 will now be described. It should be noted that these examples are also applicable to other electrical connections of directly integrated electronic circuit 400, e.g., between interconnecting element 420 and each of second positive tab 327 and negative tab 187 as, for example, shown in FIG. 5A. Furthermore, it should be noted that many of these connections are formed where is at least one component is adhered to or otherwise attached to first packaging layer 110 or any other components, which may interfere with some ways of making electrical connections. FIG. 5A illustrates an example where negative tab 187 is adhered/laminated to first packaging layer 110. While first packaging layer 110 provides mechanical support to negative tab 187, first packaging layer 110 also restricts access to one side of negative tab 187 (e.g., for electrodes or other welding probes) and also limits various conditions (e.g., high temperatures) for interconnection techniques.

The electrical resistivity of interconnections, which involve batteries, is generally desired to be as low as possible, especially for high power applications, such as electrical vehicles, grid storage and balancing, and the like. As a result, most conventional electrical connections rely on welding and soldering to achieve low electrical resistances of interconnects. However, various integrated applications, which involve printed batteries and low-power consumption devices such as sensors, Bluetooth transmitters, low power wide area networks (LoRa), narrow band internet of things (NB-IoT) transmitters, can use low-resistance connections. The electrical currents through these connections may be less than about 400 mA (e.g., for NB-IoT) or less than about 50 mA (e.g., for LoRa) or even less than 6 mA (e.g., for Bluetooth). Therefore, the resistance of interconnects for such application may be at least about 1 mOhm or even at least about 10 mOhm or even at least 100 mOhm. In some examples, the interconnect resistance is less than 5 Ohm or less than 2 Ohm or even less than 200 mOhm. Various examples of connection methods described herein provide interconnect resistances in this range and is suitable for applications in integrated devices.

Figure 6A:
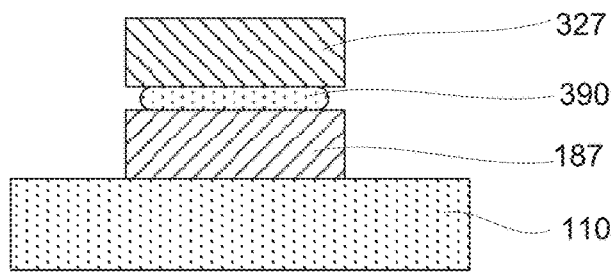
FIGS. 6A-6J are cross-sectional views of two tabs, interconnected using different techniques.

Referring to FIG. 6A, in some examples, directly integrated electronic circuit 400 further comprises connecting patch 390, disposed between second positive tab 327 and negative tab 187. Connecting patch 390 may be formed by a solder, a conductive thermosetting film, an anisotropic conductive film (ACF), or any other suitable component. For example, an ACF is applied between the two metal tabs using a hot bar application (180° C.-220° C.) thereby curing the ACF and providing permanent attachment between the tabs. This hot bar technique may be performed for a short (e.g., less than 30 seconds) period of time to avoid impact on first packaging layer 110. It should be noted that first packaging layer 110 extends under and supports the interconnection between second positive tab 327 and negative tab 187.

In some examples, the connection between second positive tab 327 and negative tab 187 is formed by direct contact. For example, second positive tab 327 is printed over negative tab 187 or vice versa.

Figure 6B:
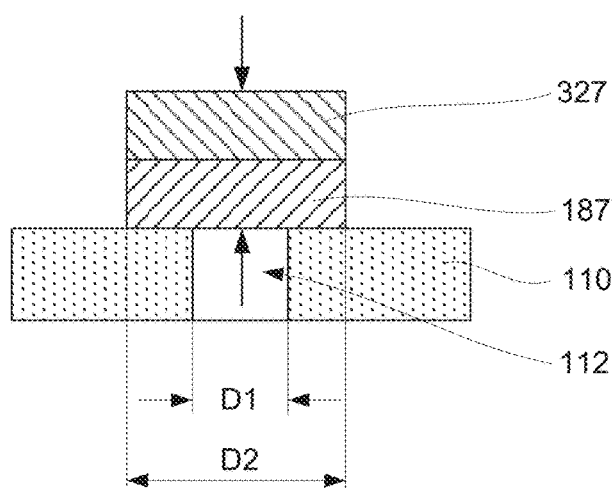
Figure 6C:
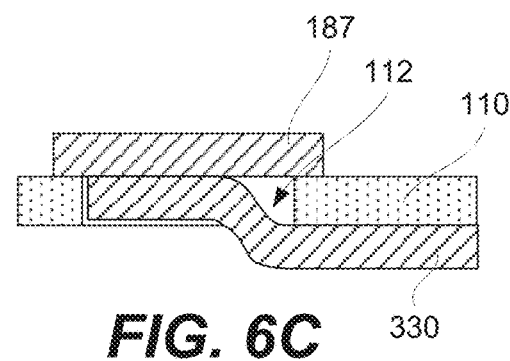

Referring to FIG. 6B, in some examples, first packaging layer 110 comprises opening 112, overlapping with negative tab 187 (and a foot print of second positive tab 327). Opening 112 is used to access the surface of negative tab 187, e.g., during welding such resistance welding, ultrasonic welding, laser welding, and the like. Furthermore, opening 112 allows forming a connection to negative tab 187 through first packaging layer 110, e.g., to additional component 330 positioned on the other side of first packaging layer 110 as schematically shown in FIG. 6C.

Referring to FIG. 6B, in some examples, the size (D1) of opening 112 is smaller than the size (D2) of negative tab 187. The size may be referred to as a diameter, width, or any other relevant dimension. The small size of opening 112 allows providing support to negative tab 187 around opening 112. In some examples, opening 112 is sealed (e.g., filed) after forming a connection between second positive tab 327 and negative tab 187. The size of opening 112 is sufficient to access negative tab 187 while forming the connection and also sufficient to avoid damaging first packaging layer 110 while forming this connection.

Figure 6D:
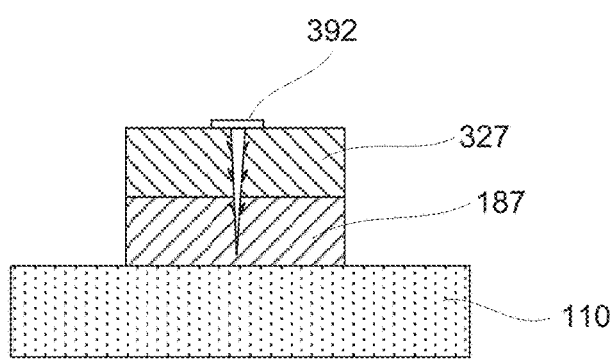
Figure 6E:
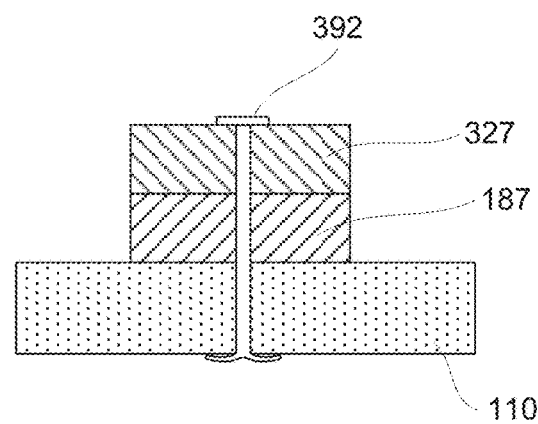

Referring to FIGS. 6D and 6E, in some examples, directly integrated electronic circuit 400 comprises mechanical crimp 392 interconnecting second positive tab 327 and negative tab 187. FIG. 6D illustrates an example, in which mechanical crimp 392 extends only through second positive tab 327 and negative tab 187 but not through first packaging layer 110. In this example, the entire surface of first packaging layer 110 remains insulating. FIG. 6E illustrates another example where mechanical crimp 392 also extends through first packaging layer 110, which provides an contact on the other side of first packaging layer 110. In this example, mechanical crimp 392 may be referred to as a rivet. In a more specific example, mechanical crimp 392 is a self-piercing rivet. The size of the rivet head may be larger (not shown) or smaller (shown) than the tabs, which, in some embodiments, has a principal dimension (e.g., a diameter) of the footprint of between 1 millimeter and 5 millimeters. In some examples, the connection is formed by riveting, where a sharp tool is pierced through second positive tab 327 and negative tab 187 and even through first packaging layer 110.

This tool forms tongs in the top component of the pierced stack (e.g., a tab or a packaging layer) and may also form a flange on the opposite side of the stack (e.g., as shown in FIG. 6E). The dimensions of the opening create by the riveting tool, the toughness of the top material and the thickness of the top material should allow for stable mechanical connection.

Figure 6F:
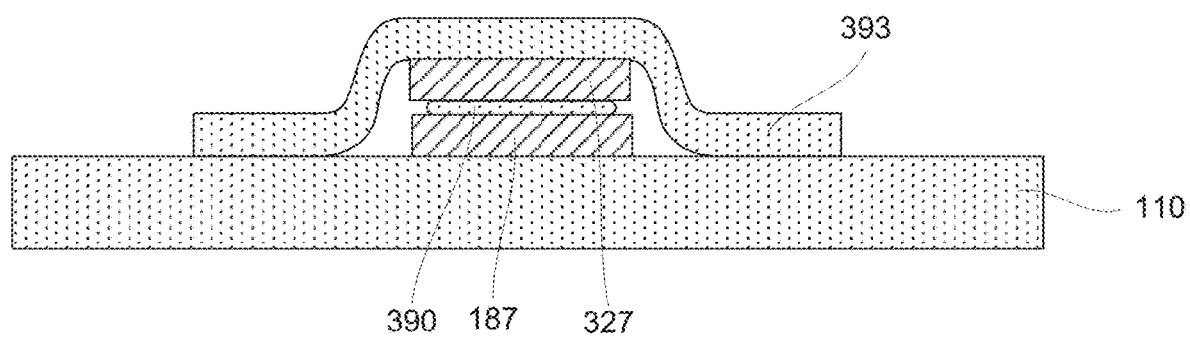

Referring to FIG. 6F, in some examples, the connection between second positive tab 327 and negative tab 187 is sealed between first packaging layer 110 and connector seal 393. Connector seal 393 is adhered, e.g., to first packaging layer 110, on each side of the formed connection between second positive tab 327 and negative tab 187. In some examples, connector seal 393 is a part of second packaging layer 190. Alternatively, connector seal 393 is a standalone structure, such as a strip of an adhesive material, a drop of epoxy, and the like. In additional to providing electrical insulation, connector seal 393 may provide mechanical support to the formed connection.

Figure 6G:
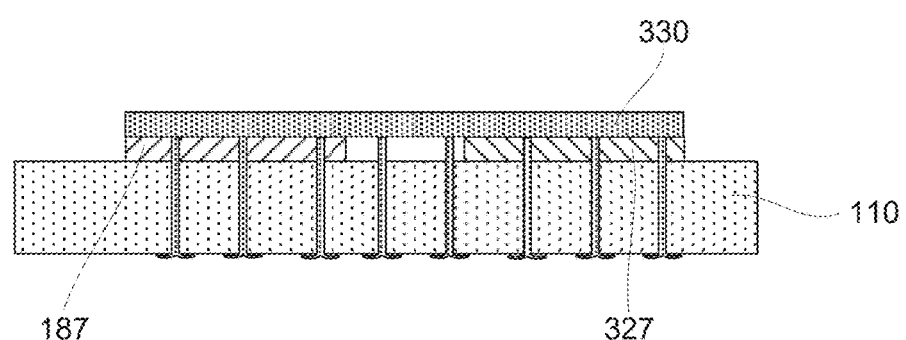
Figure 6H:
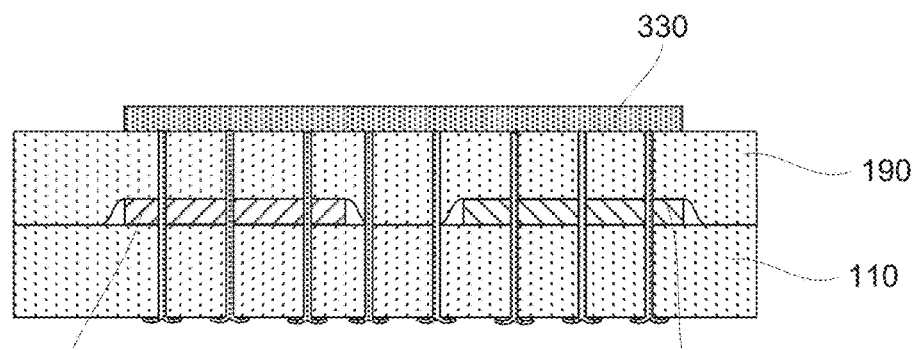

While FIGS. 6A-6F illustrates a connection where two tabs are stacked on the top of each other, in some examples, the interconnected tabs do not directly overlap. Referring to FIG. 6G, second positive tab 327 and negative tab 187 are positioned adjacent to each other and supported on first packaging layer 110. The connection is provided by additional component 330, which is stacked separately with each of second positive tab 327 and negative tab 187. In the exampled shown in FIG. 6G, each of second positive tab 327 and negative tab 187 directly interfaces with additional component 330 and riveted to additional component 330 (as well as to first packaging layer 110). However, one having ordinary skill in the art would understand that other interconnects are also within the scope. FIG. 6H illustrates an example in which additional component 330 is separated from second positive tab 327 and negative tab 187 by second packaging layer 190 while still being electrically and mechanically connected to second positive tab 327 and negative tab 187 through second packaging layer 190.

Figure 6I:
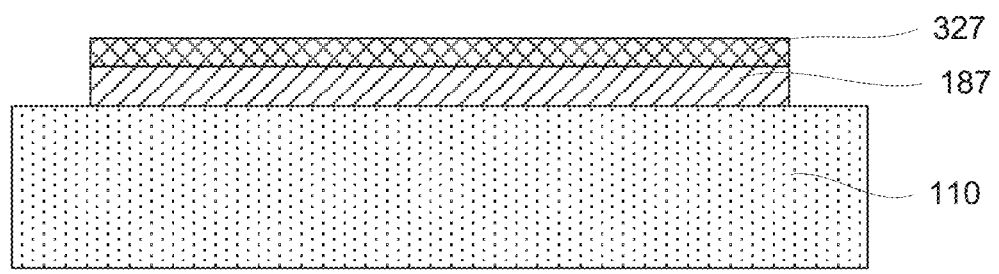
Figure 6J:
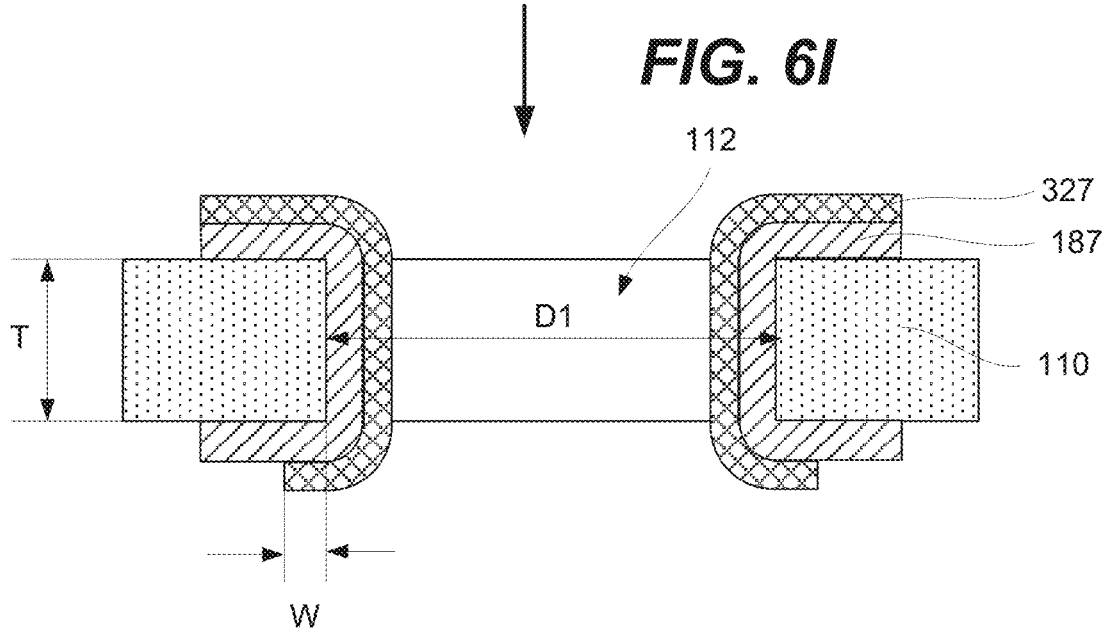

FIGS. 6I and 6J illustrate an example of forming a stacking connection, where at least second positive tab 327 is operable as a rivet. Specifically, FIG. 6I illustrates a stack prior to forming this stacking connection, where second positive tab 327 and negative tab 187 are stacked together over first packaging layer 110. It should be noted that at this stage, neither one of these components comprises an opening. FIG. 6J illustrates a stack after forming the electrical and mechanical connection, which involves forming opening 112 in first packaging layer 110 and folding and wrapping around at least the top component (second positive tab 327 in which example) around the end of opening 112. This wrapping depends on the number of factors, such as the size (D1) of opening 112, the thickness (T) of first packaging layer 110, material properties of second positive tab 327, as well as the size (thickness) and material properties of negative tab 187. While FIG. 6J illustrates a portion of negative tab 187 wrapping around the edge of opening 112, other examples are also within the scope (e.g., a portion of negative tab 187, corresponding to opening 112, being partially or completely removed/punched out). The design of the connection is such that second positive tab 327 has a sufficient size (W) of the end wrapping over the end edge of opening 112.

In some examples, the connection between second positive tab 327 and negative tab 187 is removable, which would allow, e.g., to disconnect and replace electrochemical cell 100 in directly integrated electronic circuit 400. For example, the connection is established by a slidable connector. Alternatively, the connection between second positive tab 327 and negative tab 187 is permanent.

While FIGS. 6A-6J illustrate the connection between second positive tab 327 and negative tab 187, one having ordinary skill in the art would understand that such connections may be used between any other conductive components of directly integrated electronic circuit 400, such a connection described above with reference to FIG. 4B. Furthermore, different techniques shown in FIGS. 6A-6J may be combined together to provide a more robust electrical connection.

Figure 7A:
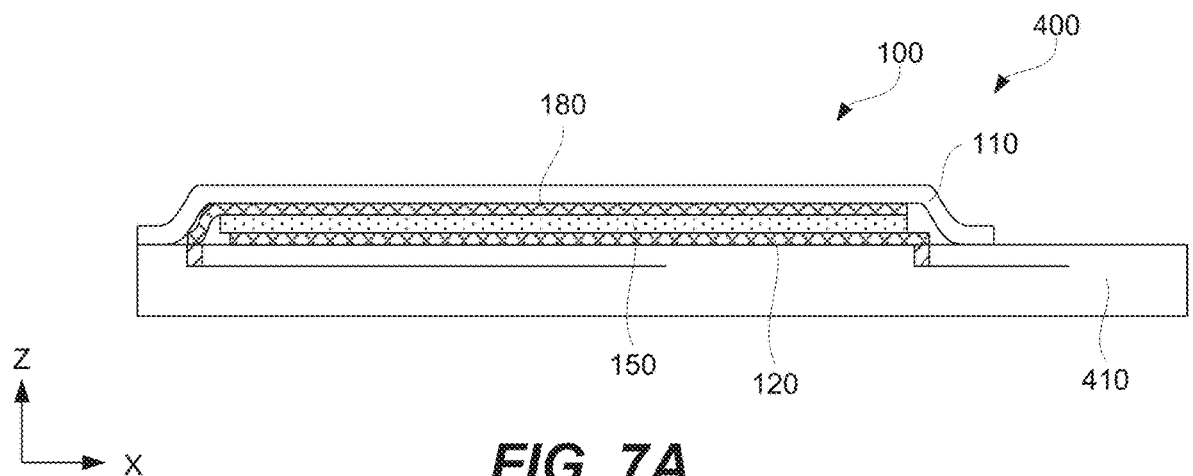
FIGS. 7A-7C are schematic cross-sectional views of electronic circuits and electrochemical cells
Figure 7B:
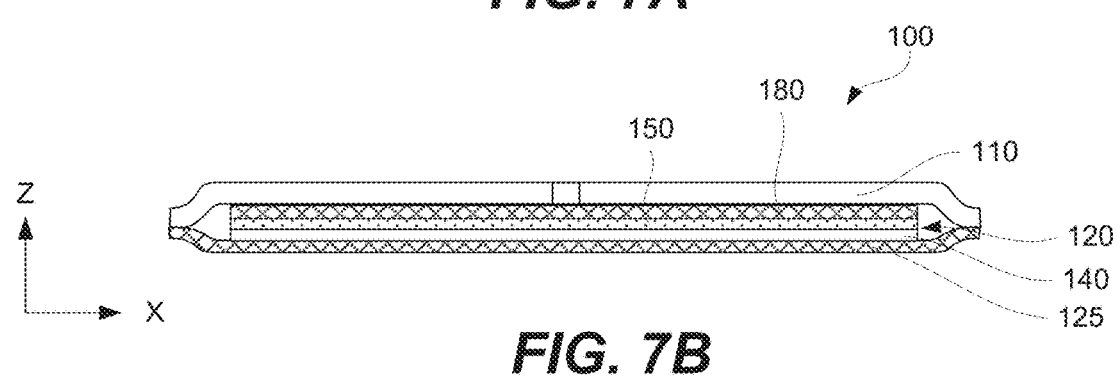

Referring to FIG. 7A, in some examples, device 410 is operable as one of packaging layers. In these examples, electrolyte layer 150, at least a portion of positive electrode 120, and at least a portion of negative electrode 180 are sealed from environment between device 410 and second packaging layer 190. In other words, edges of second packaging layer 190 contact and sealed against device 410. In some examples, device 410 is a flexible PCB.

In some examples, the environmental seal of internal components in electrochemical cell 100 is provided by one or both current collectors. Referring to an example in FIG. 7B, the environmental seal is formed by first packaging layer 110 and positive current collector 125. Positive current collector 125 is exposed and the electrical connection can be formed directly to positive current collector 125 without a need for additional tabs. Furthermore, first packaging layer 110 comprises opening for forming electrical connections to negative electrode 180. This example may be referred to as a tab-less design.

Figure 7C:
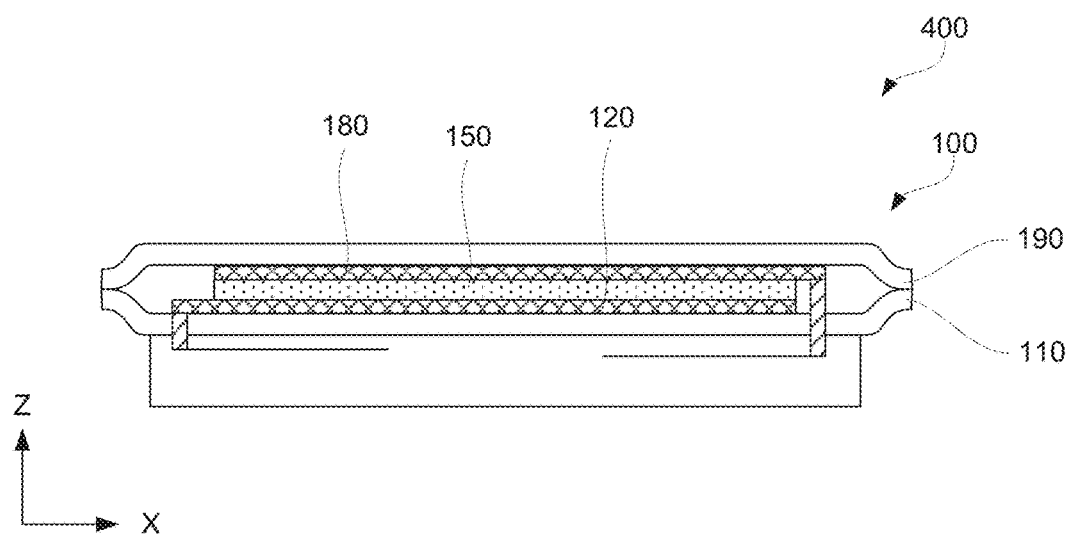

Referring to FIG. 7C, in some examples, device 410 and electrochemical cell 100 are stacked such that first packaging layer 110 is disposed between device 410 and various components of electrochemical cell 100. The electrical connections between device 410 and electrochemical cell 100 are formed through first packaging layer 110.

As described above positive electrode 120 comprises positive current collector 125 and positive active material layer 140, supported by positive current collector 125. Similarly, negative electrode 180 comprises negative current collector 185 and negative active material layer 160, supported by negative current collector 185. Referring to FIGS. 8A and 8B, in some examples, device 410 is directly connected and interfaces at least one of positive current collector 125 or negative current collector 185 or, more specifically, to positive current collector 125.

Figure 8C:
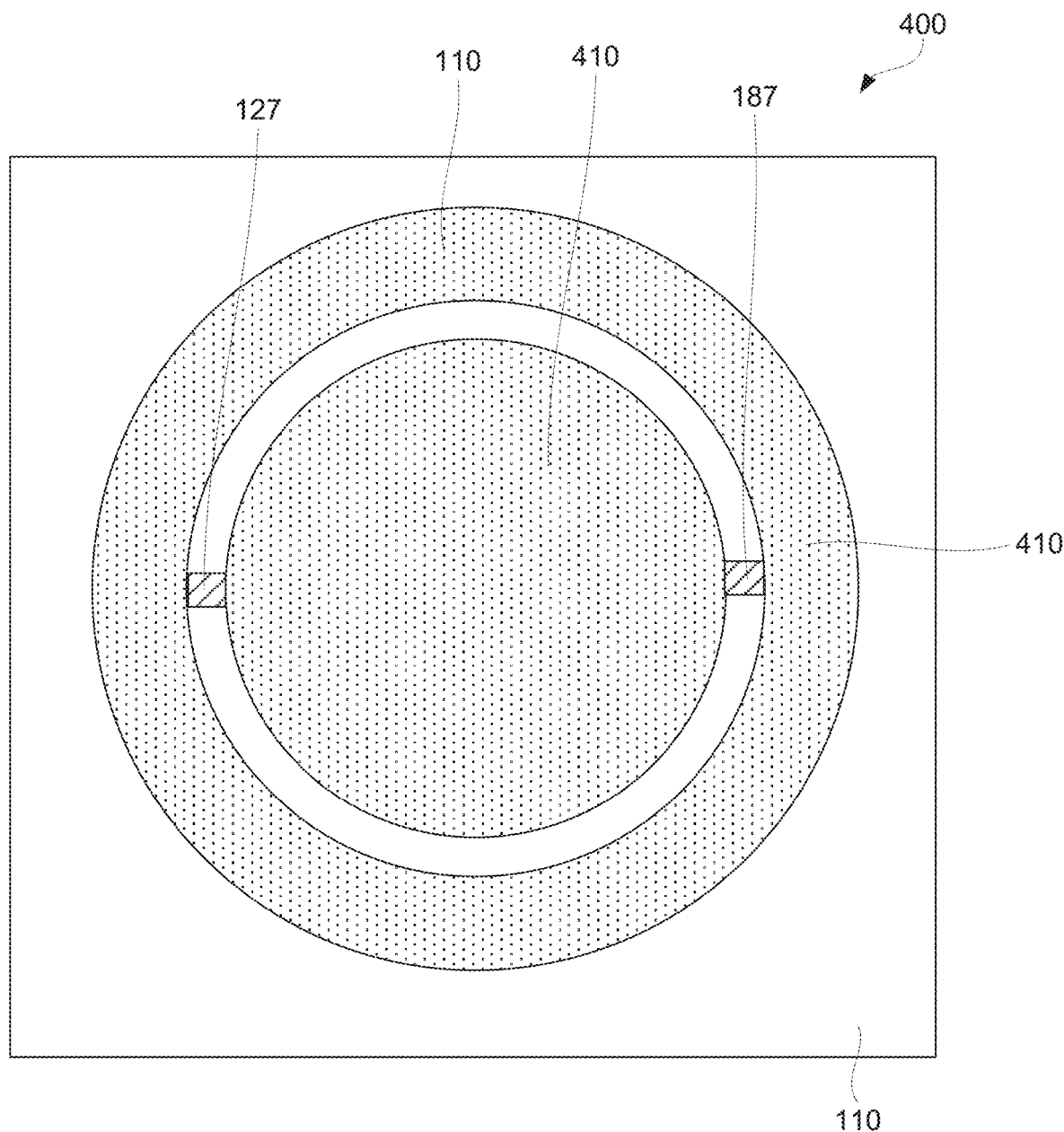
FIG. 8C is a schematic top view of a directly integrated electronic circuit, in which the electrochemical cell surrounds the device.

FIG. 8C is another example of directly integrated electronic circuit 400 in which electrochemical cell 100 surrounds device 410. Both electrochemical cell 100 and device 410 are supported in first packaging layer 110, which also supports positive tab 127 and negative tab 187, electrically interconnecting electrochemical cell 100 and device 410. This type of arrangement of electrochemical cell 100 and device 410 allows for greater utilization of space and more compact design of directly integrated electronic circuit 400.

Processing Examples

Figure 9:
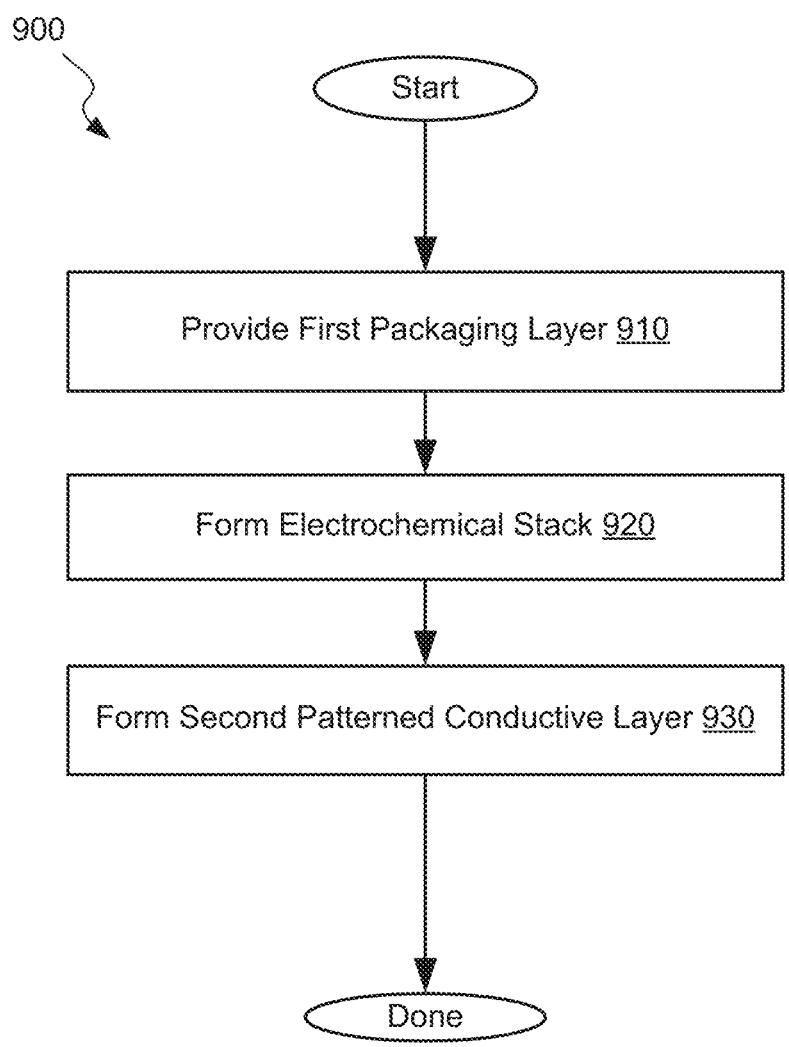
FIG. 9 is a processing flowchart corresponding to a method of manufacturing a directly integrated electronic circuit, in accordance with some examples.

FIG. 9 is a processing flowchart corresponding to method 900 of manufacturing directly integrated electronic circuit 400, in accordance with some examples. Method 900 comprises providing (block 910) first packaging layer 110. In some examples, first packaging layer 110 supports and directly integrated with first patterned conductive layer 123, comprising positive current collector 125, positive tab 127, and/or connecting tab 128. As shown in FIG. 8A, positive current collector 125 may be monolithic with positive tab 127. For example, first patterned conductive layer 123 may be patterned from the same sheet of metal and laminated to first packaging layer 110. In some examples, first patterned conductive layer 123 is printed over first packaging layer 110. Furthermore, first packaging layer 110 may be a part of another device, which is previously formed (e.g., printed) using first packaging layer 110. Likewise, first patterned conductive layer 123 may be a part of another device (e.g., PCB).

Method 900 proceeds with forming (block 920) electrochemical stack 105 over positive current collector 125. Referring to FIG. 2A, electrochemical stack 105 comprises positive active material layer 140, electrolyte layer 150, and negative active material layer 160. In some examples, at least one of positive active material layer 140, electrolyte layer 150, and negative active material layer 160 is printed. More specifically, positive active material layer 140 and/or other layers described below are printed using one or more of the following techniques: direct write printing, screen printing (e.g. Atma, M&R, Colt), flexographic printing (Dai's Machinery, Line O Matic), gravure printing, dispenser printing, ink jet printing (e.g., FUJIFILM Dimatix), and slot die coating.

Direct write dispenser printing comprises a method for additively depositing a variety of materials, including slurries, solutions, and suspensions, generally referred to as "inks." Direct write dispenser printing is a flow-based method of direct write patterning with the ability to deposit inks at room temperature and ambient conditions, all the while generating negligible material waste and requiring minimal environmental overhead. In comparison to conventional micro-manufacturing techniques, which utilize subtractive processes such as lithography and etching, the number of process steps, energy demanded, and waste generated is significantly less.

In some examples, printable materials for electrodes are slurries of active electrode material particles mixed with a polymer binder(s), a removable solvent, and optional additives. In one example, cathode chemistries may comprise a metal oxide such as vanadium pentoxide particles, manganese dioxide particles, or both kinds of particles as the active cathode material particles. In one example, the anode chemistries have zinc particles as the active anode material particles.

After the ink deposition, the ink is dried. In some examples, the drying is performed at a room temperature for about 1-15 minutes and then at a temperature of 60°-90° C. for about 3-30 minutes. A vacuum oven, an infrared lamp, and/or a heat lamp may be used for drying. The drying process removes one or more solvents from the deposited ink thus leaving a solid layer, which is referred to as positive active material layer 140. After all layers are printed, the entire printed stack may be dried to remove any residual evaporative solvents.

Figure 2C:
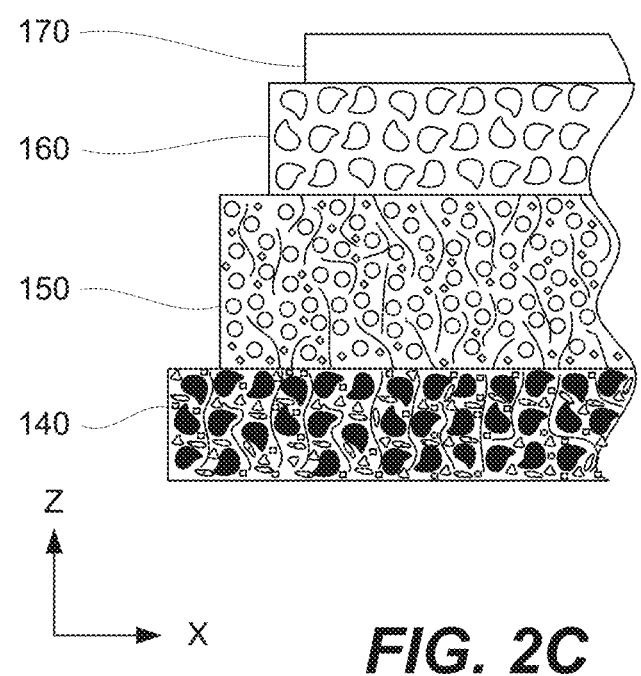

Different printing techniques used for printing positive active material layer 140, electrolyte layer 150, negative active material layer 160 may result in different alignment of these components. For example, FIG. 2B illustrates edges of positive active material layer 140, electrolyte layer 150, and negative active material layer 160 printed using screen printing. FIG. 2C illustrates edges of positive active material layer 140, electrolyte layer 150, and negative active material layer 160 printed using stencil printing. During stencil printing, the edge alignment may be similar to a pyramid due the stencil size used for printing electrolyte layer 150 being larger than the stencil for positive active material layer 140.

Referring to FIG. 9, method 900 may proceed with forming (block 930) second patterned conductive layer 183 over electrochemical stack 105. In some examples, second patterned conductive layer 183 comprises negative current collector 185, which is in electronic communication with negative active material layer 160.

In some examples, forming second patterned conductive layer 183 comprises printing second patterned conductive layer 183 over electrochemical stack 105 and over at least a portion of device 410, thereby forming a direct electrical connection between negative active material layer 160 and device 410 by second patterned conductive layer 183.

In the same or other example, forming second patterned conductive layer 183 comprises printing second patterned conductive layer 183 over electrochemical stack 105 and over at least a portion of connecting tab 128, thereby forming a direct electrical connection between negative active material layer 160 and connecting tab 128 by second patterned conductive layer 183. In some examples, at least one of connecting tab 128 or positive tab 127 is electrically connected to the device 410.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present examples are to be considered as illustrative and not restrictive.

What is claimed is:

1. A method of manufacturing a directly integrated electronic circuit, the method comprising:
   providing a first packaging layer,
      wherein the first packaging layer supports and is directly integrated with a first patterned conductive layer, comprising a positive current collector, a positive tab, and a connecting tab, and
      wherein the positive current collector is monolithic with the positive tab while the connecting tab is isolated from the positive current collector; and
   forming an electrochemical stack over the positive current collector,
      wherein the electrochemical stack comprises a positive active material layer, an electrolyte layer, and a negative active material layer,
      wherein at least one of the positive active material layer, the electrolyte layer, and the negative active material layer is printed,
      wherein the positive current collector and the positive active material layer for a positive electrode,
      wherein the negative active material layer is disposed over and in electronic communication with a negative current collector of a second patterned conductive layer, formed by a metal foil,
      wherein the second patterned conductive at least partially overlaps and forms an electrical connection with the connecting tab of the first patterned conductive layer,
      wherein the negative current collector and the negative active material layer form a negative electrode, and
      wherein the first packaging layer further supports and is directly integrated with a power-consumption device, electrically connected to the connecting tab and to the positive tab of the positive current collector.

2. The method of claim 1, wherein the second patterned conductive layer is printed over the electrochemical stack and over at least a portion of the connecting tab, thereby forming a direct electrical connection between the negative active material layer and the connecting tab by the second patterned conductive layer.

3. The method of claim 1, wherein at least one of the connecting tab or the positive tab is electrically connected to the device.

4. The method of claim 1, wherein:
   the directly integrated electronic circuit further comprises a second packaging layer, and
   the first packaging layer and the second packaging layer are sealed to each other and isolate the electrochemical stack from an environment.

5. The method of claim 1, wherein the connecting tab and the positive tab of the positive current collector, connected to the power-consumption device, are laminated to the first packaging layer.

6. The method of claim 1, wherein the power-consumption device is electrically connected to the positive electrode using a mechanical crimp.

7. The method of claim 6, wherein the mechanical crimp protrudes through the first packaging layer.

8. The method of claim 1, wherein a portion of the power-consumption device is stacked with a portion of the positive electrode.

9. The method of claim 8, wherein the directly integrated electronic circuit further comprises a connector seal, positioned over the portion of the power-consumption device stacked with the portion of the positive electrode.

10. The method of claim 1, wherein the first packaging layer comprises an opening at a location where the power-consumption device is electrically connected to the positive electrode.

11. The method of claim 10, wherein the positive electrode comprises an opening, coinciding with the opening in the first packaging layer.

12. The method of claim 1, wherein the first packaging layer is a flexible printed circuit board.

13. The method of claim 1, wherein each one of the positive active material layer, the electrolyte layer, and the negative active material layer is printed.

14. The method of claim 1, wherein the electrolyte layer is printed.

15. The method of claim 1, wherein the negative active material layer comprises zinc.

16. The method of claim 1, wherein at least one of the positive electrode, the electrolyte layer, or the negative electrode comprises an ionic liquid.

17. The method of claim 1, wherein each of the positive electrode, the electrolyte layer, and the negative electrode comprises an ionic liquid.

18. The method of claim 1, wherein the electrochemical stack is substantially free from organic solvents.

19. The method of claim 1, wherein the power-consumption device is selected from the group consisting of a sensor, a Bluetooth transmitter, a low power wide area network (LoRa) transmitter, and a narrow-band internet of things (NB-IoT) transmitter.

20. The method of claim 1, wherein both the connecting tab and the positive tab are electrically connected to the device.

* * * * *